(12) United States Patent
Morikawa

(10) Patent No.: US 11,044,385 B2
(45) Date of Patent: Jun. 22, 2021

(54) INFORMATION PROCESSING APPARATUS ADJUSTING CONDITION DATA FOR CONTROLLING PRINTING DEVICE HAVING PRINT HEAD

(71) Applicant: BROTHER KOGYO KABUSHIKI KAISHA, Nagoya (JP)

(72) Inventor: Shota Morikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/937,684

(22) Filed: Jul. 24, 2020

(65) Prior Publication Data
US 2021/0037165 A1 Feb. 4, 2021

(30) Foreign Application Priority Data
Jul. 31, 2019 (JP) .............................. JP2019-140600

(51) Int. Cl.
*H04N 1/60* (2006.01)
*H04N 1/00* (2006.01)
*H04N 1/053* (2006.01)

(52) U.S. Cl.
CPC ........ *H04N 1/6072* (2013.01); *H04N 1/00978* (2013.01); *H04N 1/00992* (2013.01); *H04N 1/053* (2013.01)

(58) Field of Classification Search
None
See application file for complete search history.

(56) References Cited

U.S. PATENT DOCUMENTS

| | | | |
|---|---|---|---|
| 2012/0213569 A1 | 8/2012 | Kuno | |
| 2015/0286905 A1* | 10/2015 | Kikuta | G06K 15/1881 358/1.8 |
| 2016/0303857 A1* | 10/2016 | Genta | B41J 2/1714 |
| 2017/0050431 A1 | 2/2017 | Morikawa | |

FOREIGN PATENT DOCUMENTS

| | | |
|---|---|---|
| JP | 2012-171143 A | 9/2012 |
| JP | 2015-054484 A | 3/2015 |
| JP | 2017-039205 A | 2/2017 |

* cited by examiner

*Primary Examiner* — Lennin R Rodriguezgonzalez
(74) *Attorney, Agent, or Firm* — Scully, Scott, Murphy & Presser, PC

(57) ABSTRACT

An information processing apparatus is configured to perform: acquiring target image data representing a target image made up of a plurality of partial images; determining whether a specific condition is met for each of the plurality of partial images; selecting a direction-determining method of a printing direction for each of the plurality of partial images in accordance with a determination result; determining whether the selected direction-determining method matches a correct method; and adjusting condition data for controlling a printing device so as to increase selectability of the correct method in response to determining that the selected direction-determining method differs from the correct method. The specific condition indicates that an image evaluation value be greater than or equal to a threshold. The image evaluation value represents an expected color difference between a first image printed by a first-directional partial print and a second image printed by a second-directional partial print.

18 Claims, 20 Drawing Sheets

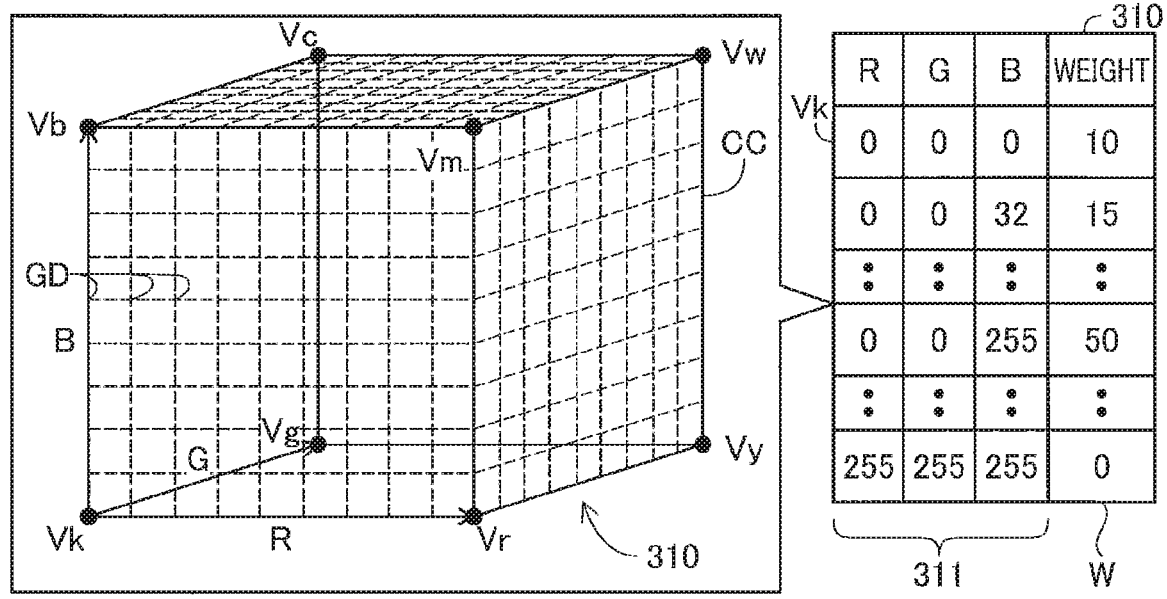

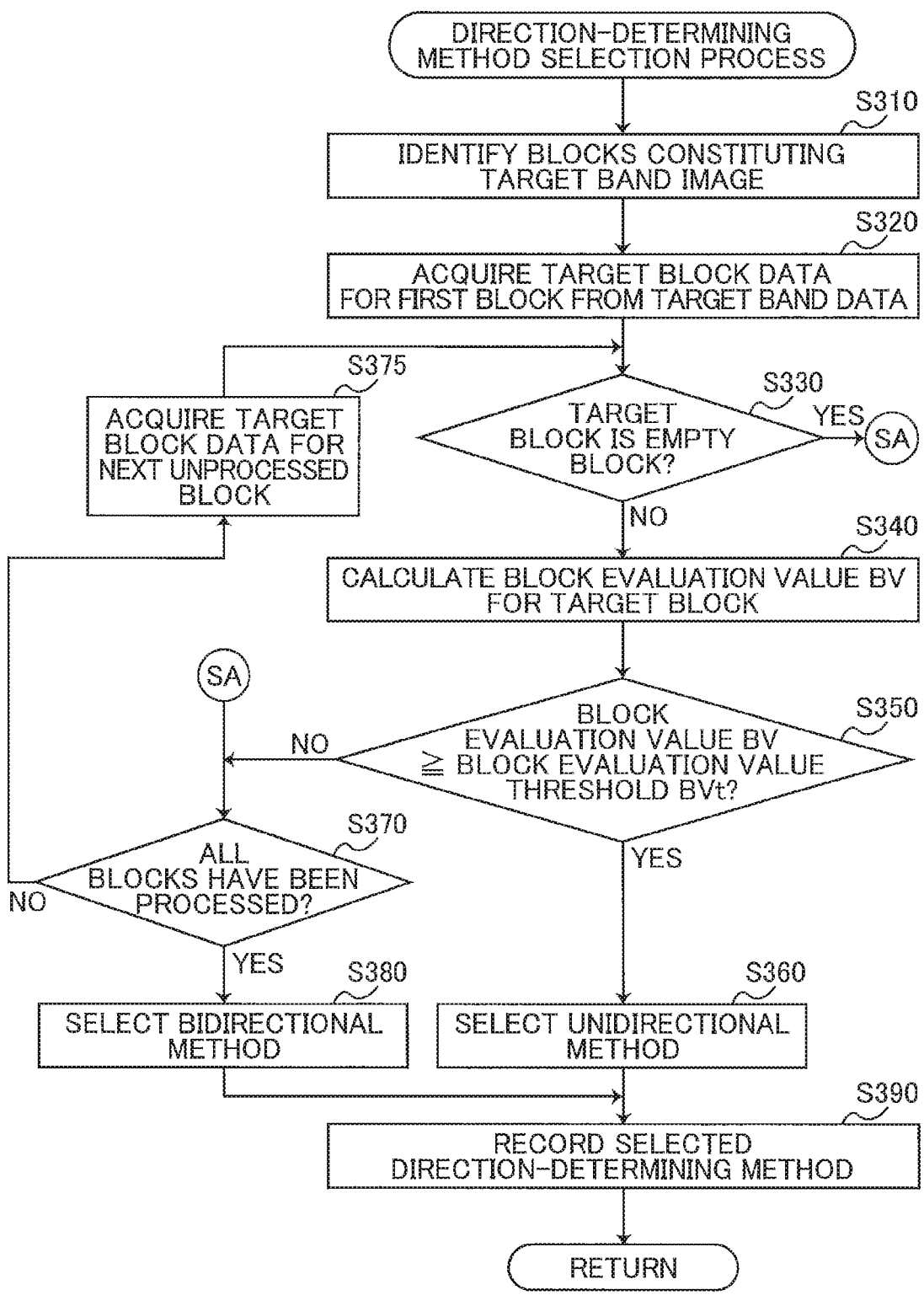

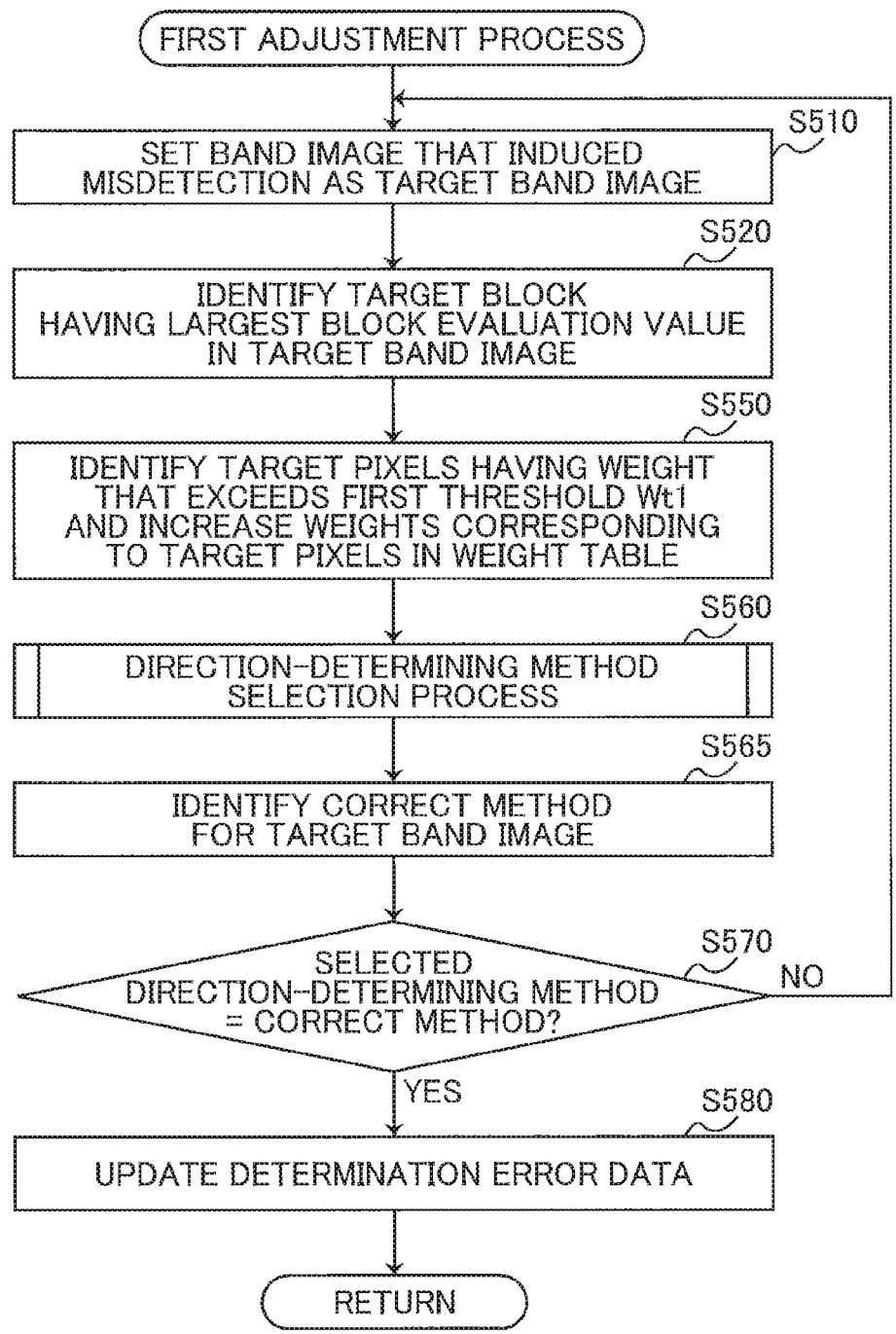

FIG. 8A
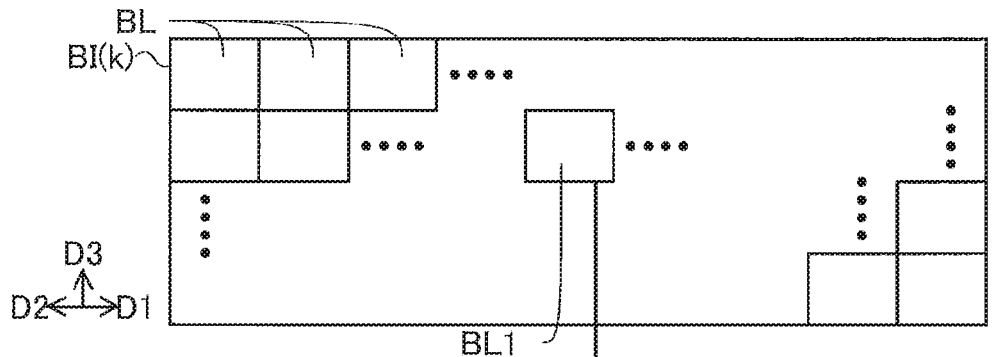
FIG. 8B
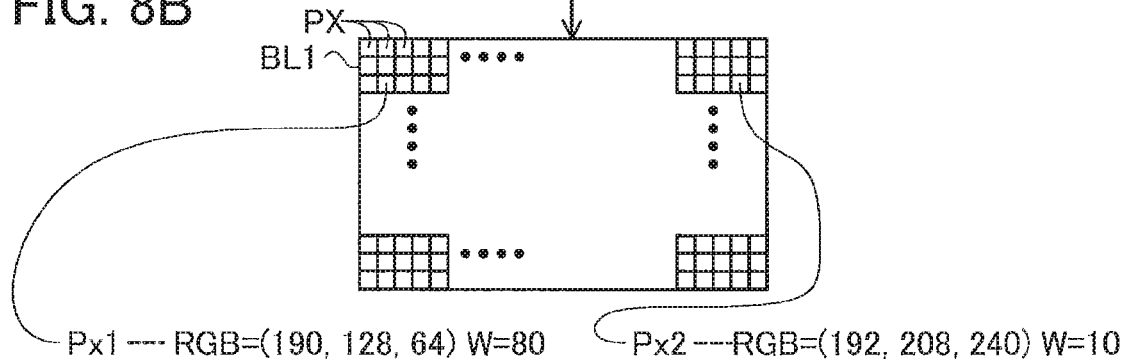
Px1 --- RGB=(190, 128, 64) W=80   Px2 --- RGB=(192, 208, 240) W=10
FIG. 8C
FIG. 8D
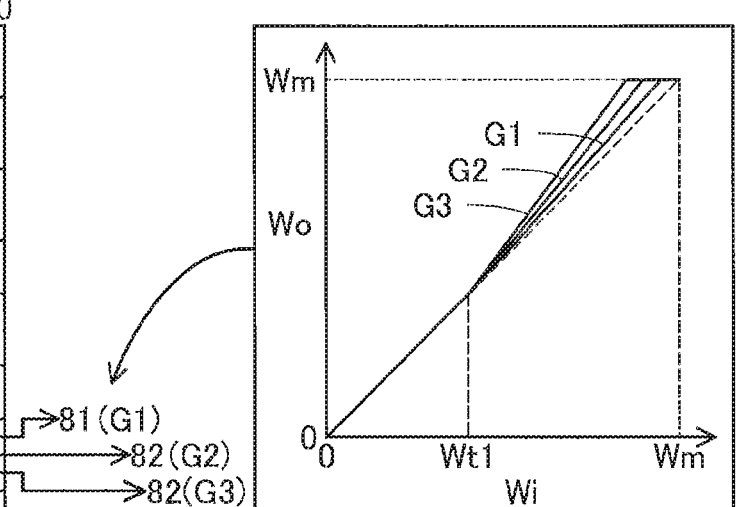

FIG. 10A
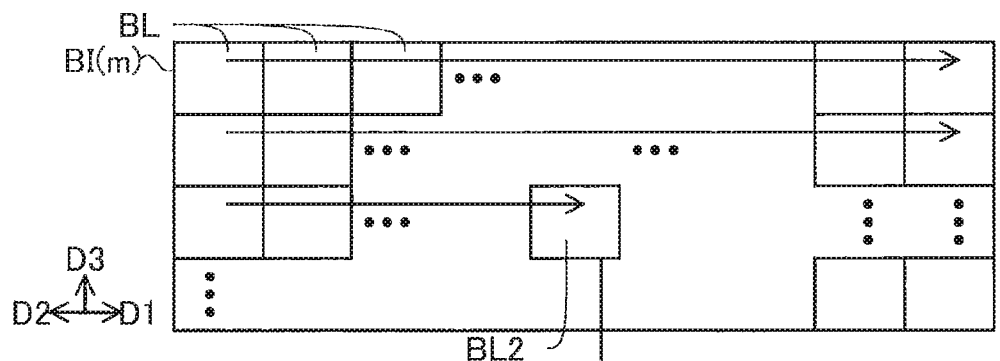
FIG. 10B
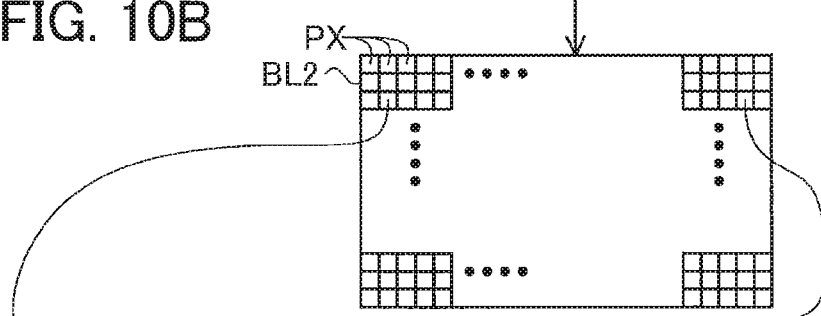
FIG. 10C
FIG. 10D
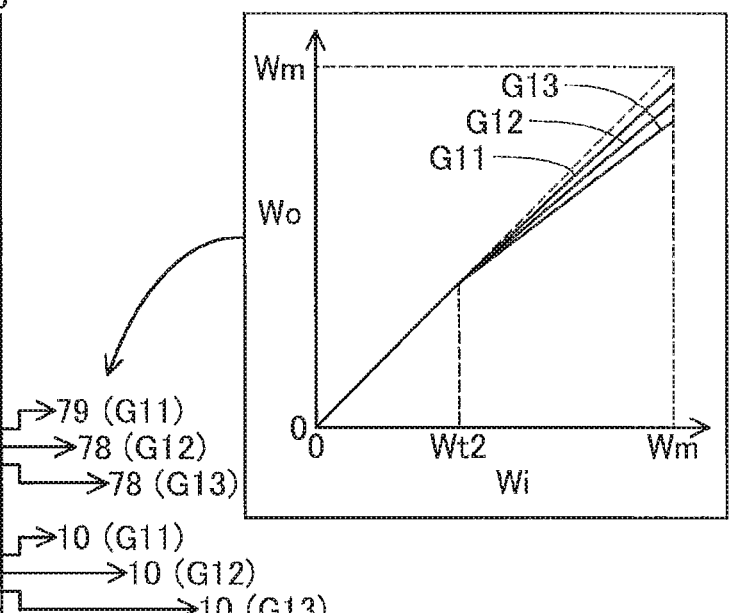

FIG. 14A

| Wt2 | BW | BH | TOTAL MISDETECTION RANK Rx |
|---|---|---|---|
| 12 | 200 | 50 | 5.0 |
| 14 | 200 | 50 | 4.5 |
| ⋮ | ⋮ | ⋮ | ⋮ |
| 10 | 250 | 50 | 4.8 |
| ⋮ | ⋮ | ⋮ | ⋮ |

| IMAGE NUMBER | PASS NUMBER | CORRECT METHOD | RANK Rk |
|---|---|---|---|
| 1 | 1 | UNIDIRECTION | 1.0 |
|   | 2 | UNIDIRECTION | 0.5 |
|   | 3 | BIDIRECTION |  |
|   | ⋮ |  |  |
| 2 | 1 | BIDIRECTION |  |
|   | 2 | UNIDIRECTION | 0.75 |
|   | 3 | BIDIRECTION |  |
|   | ⋮ |  |  |
| ⋮ | ⋮ | ⋮ | ⋮ |

| IMAGE NUMBER | PASS NUMBER | MISDETECTION RANK Rm |
|---|---|---|
| 1 | 1 |  |
|   | 2 | 0.5 |
|   | 3 |  |
|   | ⋮ |  |
| 2 | 1 |  |
|   | 2 |  |
|   | 3 |  |
|   | ⋮ |  |
| ⋮ | ⋮ | ⋮ |

380a

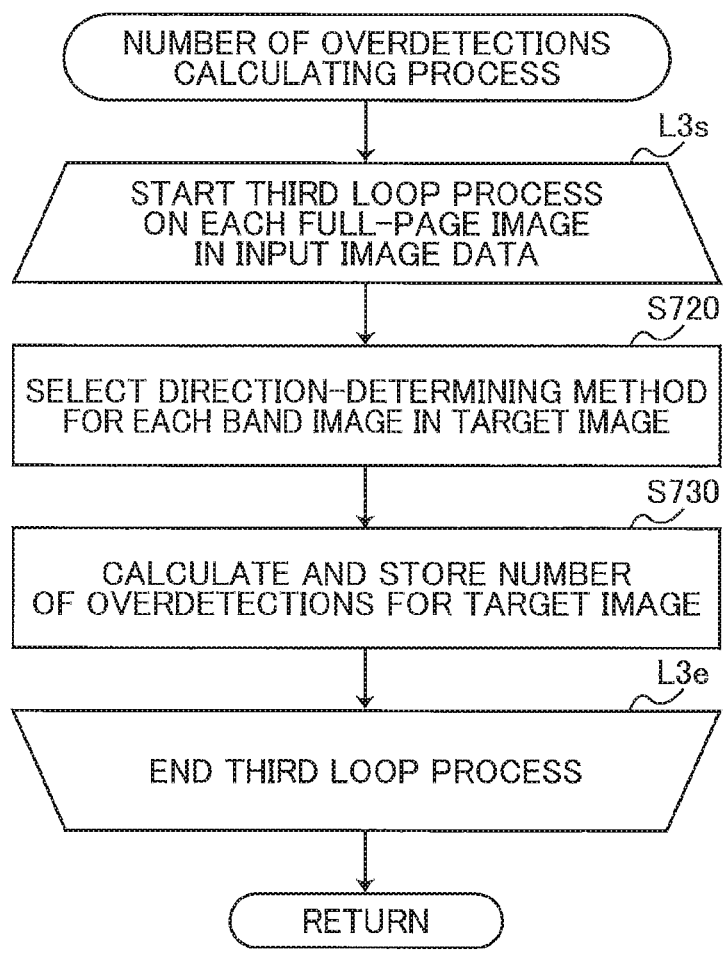

FIG. 17A
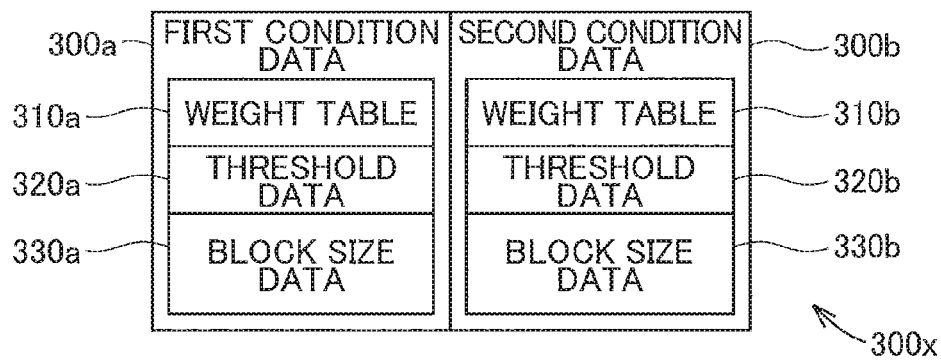
FIG. 17B
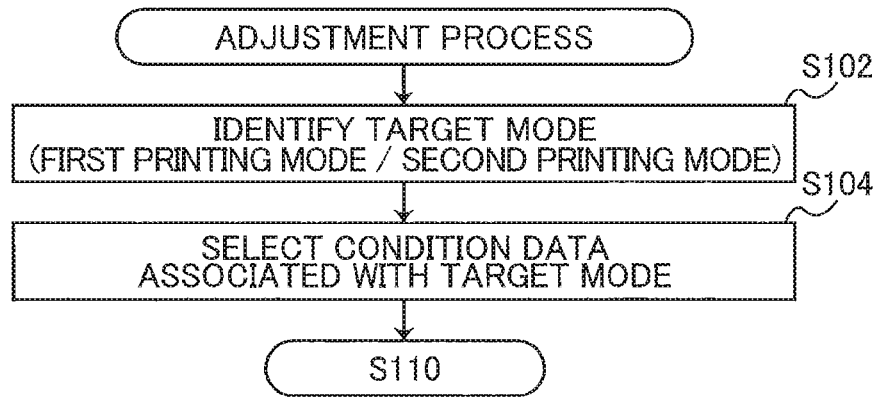
FIG. 17C
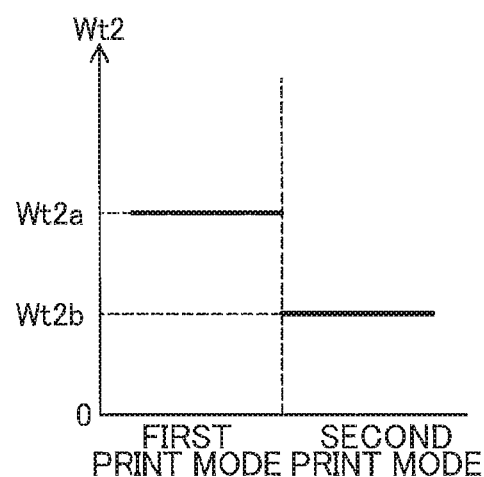
FIG. 17D

FIG. 18A
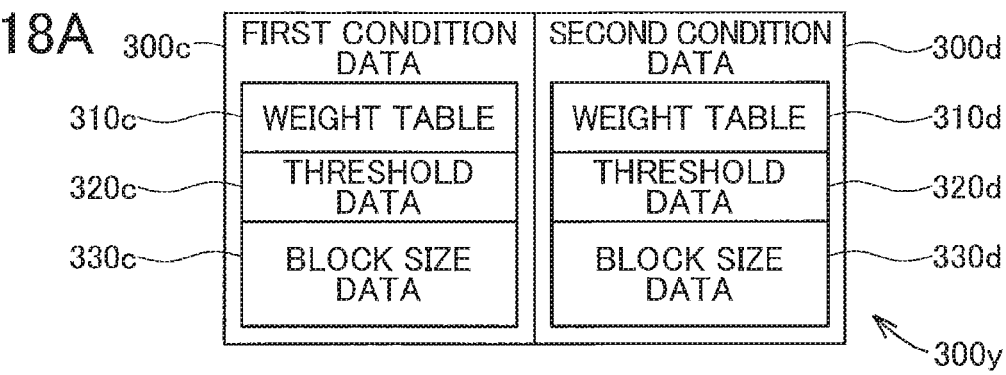
FIG. 18B
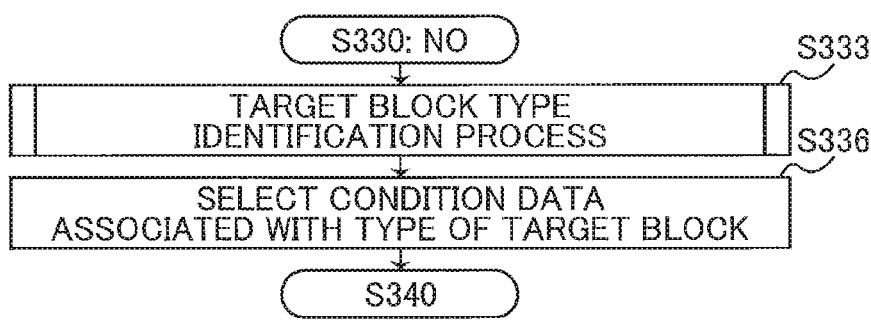
FIG. 18C
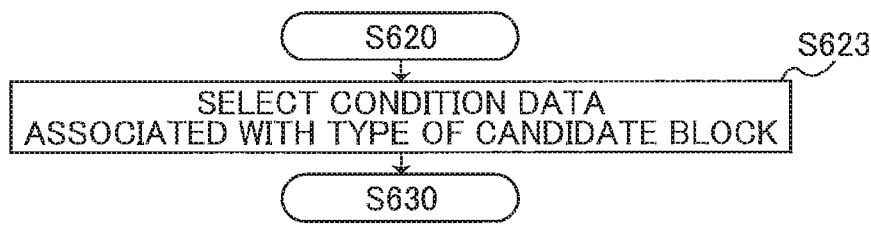
FIG. 18D
FIG. 18E
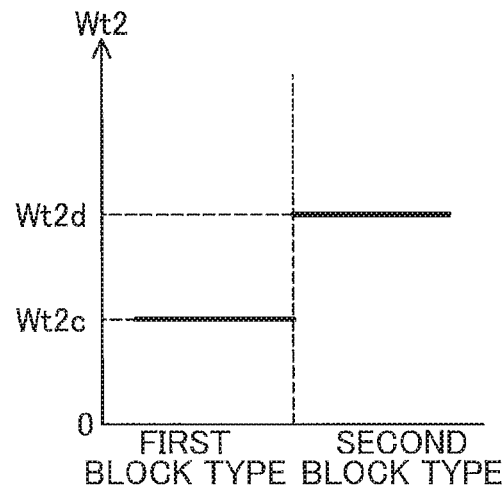

INFORMATION PROCESSING APPARATUS ADJUSTING CONDITION DATA FOR CONTROLLING PRINTING DEVICE HAVING PRINT HEAD

CROSS REFERENCE TO RELATED APPLICATION

This application claims priority from Japanese Patent Application No. 2019-140600 filed Jul. 31, 2019. The entire content of the priority application is incorporated herein by reference.

TECHNICAL FIELD

The present disclosure relates to a technology for controlling a printing device to print images.

BACKGROUND

A printing device known in the art prints a unit print area (a band) using ink in a plurality of colors by performing a main scan in a first direction or a main scan in a second direction opposite to the first direction. When printing images, this type of printing device may produce color variation (also called "color banding") in the printed images due to the different order in which colors of ink are overlapped between main scans in the first direction and main scans in the second direction. In order to suppress this color variation, the conventional device calculates an index value related to the projected ink quantity for each of a plurality of blocks constituting one band. When the index value is greater than a threshold value, the conventional device sets the main scanning direction to a specific direction.

SUMMARY

However, the conventional device may occasionally set the direction for a main scan to the specific direction, even when printing an image in which color variation is not easily noticeable, for example. Conversely, the conventional device may occasionally alternate main scans in the first direction and second direction when printing an image in which color variation is highly noticeable. This is problematic, but the condition for determining the direction of main scans in the conventional technology cannot easily be adjusted.

In view of the foregoing, it is an object of the present disclosure to provide a technology for adjusting the condition used for determining the directions of main scans.

In order to attain the above and other objects, the present disclosure provides an information processing apparatus configured to adjust condition data for controlling a printing device. The printing device includes: a print head; a reciprocating device; and a conveying device. The print head has a plurality of nozzle groups. The plurality of nozzle groups includes a first nozzle group and a second nozzle group. The first nozzle group and the second nozzle group are arranged in a main scanning direction. The first nozzle group includes a plurality of first nozzles. The plurality of first nozzles is arranged in a sub-scanning direction. The sub-scanning direction crosses the main scanning direction. Each of the plurality of first nozzles is configured to eject a droplet of ink in a first color onto a printing medium. The second nozzle group includes a plurality of second nozzles. The plurality of second nozzles is arranged in the sub-scanning direction. Each of the plurality of second nozzles is configured to eject a droplet of ink in a second color onto the printing medium. The reciprocating device is configured to perform a main scan. The main scan moves the print head relative to the printing medium in a printing direction. The printing direction is set to one of a first direction and a second direction. The first direction is parallel to the main scanning direction. The second direction is parallel to the main scanning direction and opposite to the first direction. The conveying device is configured to perform a sub scan. The sub scan intermittently moves the printing medium relative to the print head in the sub-scanning direction. The printing device is configured to repeatedly and alternately execute a partial print and the sub scan to print an image represented by image data on the printing medium. The information processing apparatus includes a controller. The controller is configured to perform: (a) acquiring; (b) determining; (c) selecting; (d) determining; and (e) adjusting. The (a) acquiring acquires target image data. The target image data represents a target image. The target image is made up of a plurality of partial images. The plurality of partial images is arranged in the sub-scanning direction. The partial print prints a single partial image on the printing medium while performing the main scan. The (b) determining determines whether a specific condition is met for each of the plurality of partial images. The specific condition indicates that an image evaluation value be greater than or equal to a threshold. The image evaluation value is calculated for each of the plurality of partial images using the condition data. The image evaluation value for a target partial image represents an expected color difference between a first target partial image printed by a first-directional partial print and a second target partial image printed by a second-directional partial print. The first-directional partial print is the partial print in which the printing direction is set to the first direction. The second-directional partial print is the partial print in which the printing direction is set to the second direction. The (c) selecting selects a direction-determining method for each of the plurality of partial images from a first determination method and a second determination method in accordance with a determination result of whether the specific condition is met in the (b) determining. The first determination method sets the printing direction for the target partial image to a predetermined direction. The second determination method sets the printing direction for the target partial image to a direction opposite to the printing direction set for a preceding partial image. The target partial image is printed subsequent to the preceding partial image. The (d) determining determines whether the selected direction-determining method selected for each of the plurality of partial images in the (c) selecting matches a correct method. The correct method is predetermined for each of the plurality of partial images. The (e) adjusting adjusts the condition data in response to determining that the selected-direction determining method differs from the correct method. The (e) adjusting performs at least one of: (e1) adjusting; and (e2) adjusting. The (e1) adjusting adjusts the condition data so as to increase selectability of the first determination method in a case where the selected direction-determining method is the second determination method while the correct method is the first determination method. The (e2) adjusting adjusts the condition data so as to increase selectability of the second determination method in a case where the selected direction-determining method is the first determination method while the correct method is the second determination method.

According to another aspect, the present disclosure also provides an adjusting method for adjusting condition data for controlling a printing device. The printing device includes: a print head; a reciprocating device; and a conveying device. The print head has a plurality of nozzle groups. The plurality of nozzle groups includes a first nozzle group and a second nozzle group. The first nozzle group and the second nozzle group are arranged in a main scanning direction. The first nozzle group includes a plurality of first nozzles. The plurality of first nozzles is arranged in a sub-scanning direction. The sub-scanning direction crosses the main scanning direction. Each of the plurality of first nozzles is configured to eject a droplet of ink in a first color onto a printing medium. The second nozzle group includes a plurality of second nozzles. The plurality of second nozzles is arranged in the sub-scanning direction. Each of the plurality of second nozzles is configured to eject a droplet of ink in a second color onto the printing medium. The reciprocating device is configured to perform a main scan. The main scan moves the print head relative to the printing medium in a printing direction. The printing direction is set to one of a first direction and a second direction. The first direction is parallel to the main scanning direction. The second direction is parallel to the main scanning direction and opposite to the first direction. The conveying device is configured to perform a sub scan. The sub scan intermittently moves the printing medium relative to the print head in the sub-scanning direction. The printing device is configured to repeatedly and alternately execute a partial print and the sub scan to print an image represented by image data on the printing medium. The adjusting method includes: (a) acquiring; (b) determining; (c) selecting; (d) determining; and (e) adjusting. The (a) acquiring acquires target image data. The target image data represents a target image. The target image is made up of a plurality of partial images. The plurality of partial images is arranged in the sub-scanning direction. The partial print prints a single partial image on the printing medium while performing the main scan. The (b) determining determines whether a specific condition is met for each of the plurality of partial images. The specific condition indicates that an image evaluation value be greater than or equal to a threshold. The image evaluation value is calculated for each of the plurality of partial images using the condition data. The image evaluation value for a target partial image represents an expected color difference between a first target partial image printed by a first-directional partial print and a second target partial image printed by a second-directional partial print. The first-directional partial print is the partial print in which the printing direction is set to the first direction. The second-directional partial print is the partial print in which the printing direction is set to the second direction. The (c) selecting selects a direction-determining method for each of the plurality of partial images from a first determination method and a second determination method in accordance with a determination result of whether the specific condition is met in the (b) determining. The first determination method sets the printing direction for the target partial image to a predetermined direction. The second determination method sets the printing direction for the target partial image to a direction opposite to the printing direction set for a preceding partial image. The target partial image is printed subsequent to the preceding partial image. The (d) determining determines whether the selected direction-determining method selected for each of the plurality of partial images in the (c) selecting matches a correct method. The correct method is predetermined for each of the plurality of partial images. The (e) adjusting adjusts the condition data in response to determining that the selected-direction determining method differs from the correct method. The (e) adjusting performs at least one of: (e1) adjusting; and (e2) adjusting. The (e1) adjusting adjusts the condition data so as to increase selectability of the first determination method in a case where the selected direction-determining method is the second determination method while the correct method is the first determination method. The (e2) adjusting adjusts the condition data so as to increase selectability of the second determination method in a case where the selected direction-determining method is the first determination method while the correct method is the second determination method.

According to still another aspect, the present disclosure also provides a non-transitory computer readable storage medium storing a set of program instructions installed on and executed by a computer. The computer is configured to adjust condition data for controlling a printing device. The printing device includes: a print head; a reciprocating device; and a conveying device. The print head has a plurality of nozzle groups. The plurality of nozzle groups includes a first nozzle group and a second nozzle group. The first nozzle group and the second nozzle group are arranged in a main scanning direction. The first nozzle group includes a plurality of first nozzles. The plurality of first nozzles is arranged in a sub-scanning direction. The sub-scanning direction crosses the main scanning direction. Each of the plurality of first nozzles is configured to eject a droplet of ink in a first color onto a printing medium. The second nozzle group includes a plurality of second nozzles. The plurality of second nozzles is arranged in the sub-scanning direction. Each of the plurality of second nozzles is configured to eject a droplet of ink in a second color onto the printing medium. The reciprocating device is configured to perform a main scan. The main scan moves the print head relative to the printing medium in a printing direction. The printing direction is set to one of a first direction and a second direction. The first direction is parallel to the main scanning direction. The second direction is parallel to the main scanning direction and opposite to the first direction. The conveying device is configured to perform a sub scan. The sub scan intermittently moves the printing medium relative to the print head in the sub-scanning direction. The printing device is configured to repeatedly and alternately execute a partial print and the sub scan to print an image represented by image data on the printing medium. The set of program instructions includes: (a) acquiring; (b) determining; (c) selecting; (d) determining; and (e) adjusting. The (a) acquiring acquires target image data. The target image data represents a target image. The target image is made up of a plurality of partial images. The plurality of partial images is arranged in the sub-scanning direction. The partial print prints a single partial image on the printing medium while performing the main scan. The (b) determining determines whether a specific condition is met for each of the plurality of partial images. The specific condition indicates that an image evaluation value be greater than or equal to a threshold. The image evaluation value is calculated for each of the plurality of partial images using the condition data. The image evaluation value for a target partial image represents an expected color difference between a first target partial image printed by a first-directional partial print and a second target partial image printed by a second-directional partial print. The first-directional partial print is the partial print in which the printing direction is set to the first direction. The second-directional partial print is the partial print in which the printing direction is set to the second direction. The (c) selecting selects a direction-determining method for each of the plurality of partial images from a first determination method and a second determination method in accordance with a determination result of whether the specific condition is met in the (b) determining. The first determination method sets the printing direction for the target partial image to a predetermined direction. The second determination method sets the printing direction for the target partial image to a direction opposite to the printing direction set for a preceding partial image. The target partial image is printed subsequent to the preceding partial image. The (d) determining determines whether the selected direction-determining method selected for each of the plurality of partial images in the (c) selecting matches a correct method. The correct method is predetermined for each of the plurality of partial images. The (e) adjusting adjusts the condition data in response to determining that the selected-direction determining method differs from the correct method. The (e) adjusting performs at least one of: (e1) adjusting; and (e2) adjusting. The (e1) adjusting adjusts the condition data so as to increase selectability of the first determination method in a case where the selected direction-determining method is the second determination method while the correct method is the first determination method. The (e2) adjusting adjusts the condition data so as to increase selectability of the second determination method in a case where the selected direction-determining method is the first determination method while the correct method is the second determination method.

BRIEF DESCRIPTION OF THE DRAWINGS

The particular features and advantages of the disclosure as well as other objects will become apparent from the following description taken in connection with the accompanying drawings, in which:

FIG. 3A is an explanatory diagram illustrating a color solid expressed in RGB components and an example of a weight table specifying correlations between RGB color values and weights for a plurality of grid points;

FIG. 3B is an explanatory diagram illustrating an example of correct method data according to the first embodiment specifying correlations between image numbers, pass numbers, and correct methods;

FIG. 3C is an explanatory diagram illustrating an example of determination error data according to the first embodiment specifying correlations between image numbers, determination results, and pass numbers;

FIG. 6 is a flowchart illustrating steps in an example of a direction-determining method selection process executed by the processor of the multifunction peripheral according to the first embodiment of the present disclosure;

FIG. 7 is a flowchart illustrating steps in an example of a first adjustment process executed by the processor of the multifunction peripheral according to the first embodiment of the present disclosure;

FIGS. 8A through 8D are explanatory diagrams for the first adjustment process according to the first embodiment, in which FIG. 8A illustrates a target band image divided into a plurality of blocks including a target block, FIG. 8B illustrates pixels in the target block including a first pixel and a second pixel, FIG. 8C illustrates the weight table specifying correlations between RGB color values and unadjusted weights for the grid points and three adjusted weights for each of a first grid point and a second grid point respectively corresponding to the first pixel and the second pixel illustrated in FIG. 8B, and FIG. 8D illustrates a graph including graph lines depicting correlations between the unadjusted weight and adjusted weight;

FIGS. 10A through 10D are explanatory diagrams for the second adjustment process according to the first embodiment, in which FIG. 10A illustrates a target band image divided into a plurality of blocks including a target block, FIG. 10B illustrates pixels in the target block including a first pixel and a second pixel, FIG. 10C illustrates the weight table specifying correlations between RGB color values and unadjusted weights for the grid points and three adjusted weights for each of a first grid point and a second grid point respectively corresponding to the first pixel and the second pixel illustrated in FIG. 10B, and FIG. 10D illustrates a graph including graph lines depicting correlations between the unadjusted weight and adjusted weight;

FIG. 14A is an explanatory diagram illustrating an example of condition settings data according to the second embodiment specifying correlations between second thresholds, block widths, block heights, and total misdetection ranks;

FIG. 14B is an explanatory diagram illustrating an example of correct method data according to the second embodiment specifying correlations between image numbers, pass numbers, correct methods, and ranks;

FIG. 14C is an explanatory diagram illustrating an example of determination error data according to the second embodiment specifying correlations between image numbers, pass numbers, and misdetection ranks;

FIG. 15 is a flowchart illustrating steps in an example of a number of overdetections calculating process executed by the processor of the multifunction peripheral according to the second embodiment of the present disclosure;

FIG. 17A is an explanatory diagram illustrating condition data according to a fourth embodiment;

FIG. 17B is an explanatory diagram illustrating sample combinations for a first printing mode and a second printing mode selected for the printing process according to the fourth embodiment;

FIG. 17C shows a portion of a flowchart illustrating steps in the adjustment process executed by the processor of the multifunction peripheral according to the fourth embodiment of the present disclosure;

FIG. 17D is a graph showing correlations between a target mode and the second threshold, where a horizontal axis represents the target mode and a vertical axis represents the second threshold;

FIG. 18A is an explanatory diagram illustrating condition data according to a fifth embodiment;

FIG. 18B is an explanatory diagram illustrating sample combinations for a first block type and a second block type employed in the fifth embodiment;

FIG. 18C shows a portion of a flowchart illustrating steps in the direction-determining method selection process executed by the processor of the multifunction peripheral according to the fifth embodiment of the present disclosure;

FIG. 18D shows a portion of a flowchart illustrating steps in the second adjustment process executed by the processor of the multifunction peripheral according to the fifth embodiment of the present disclosure;

FIG. 18E illustrates a graph showing correlations between a type of block and the second threshold, where a horizontal axis represents the type of block and a vertical axis represents the second threshold;

DETAILED DESCRIPTION

A. First Embodiment

Figure 1:
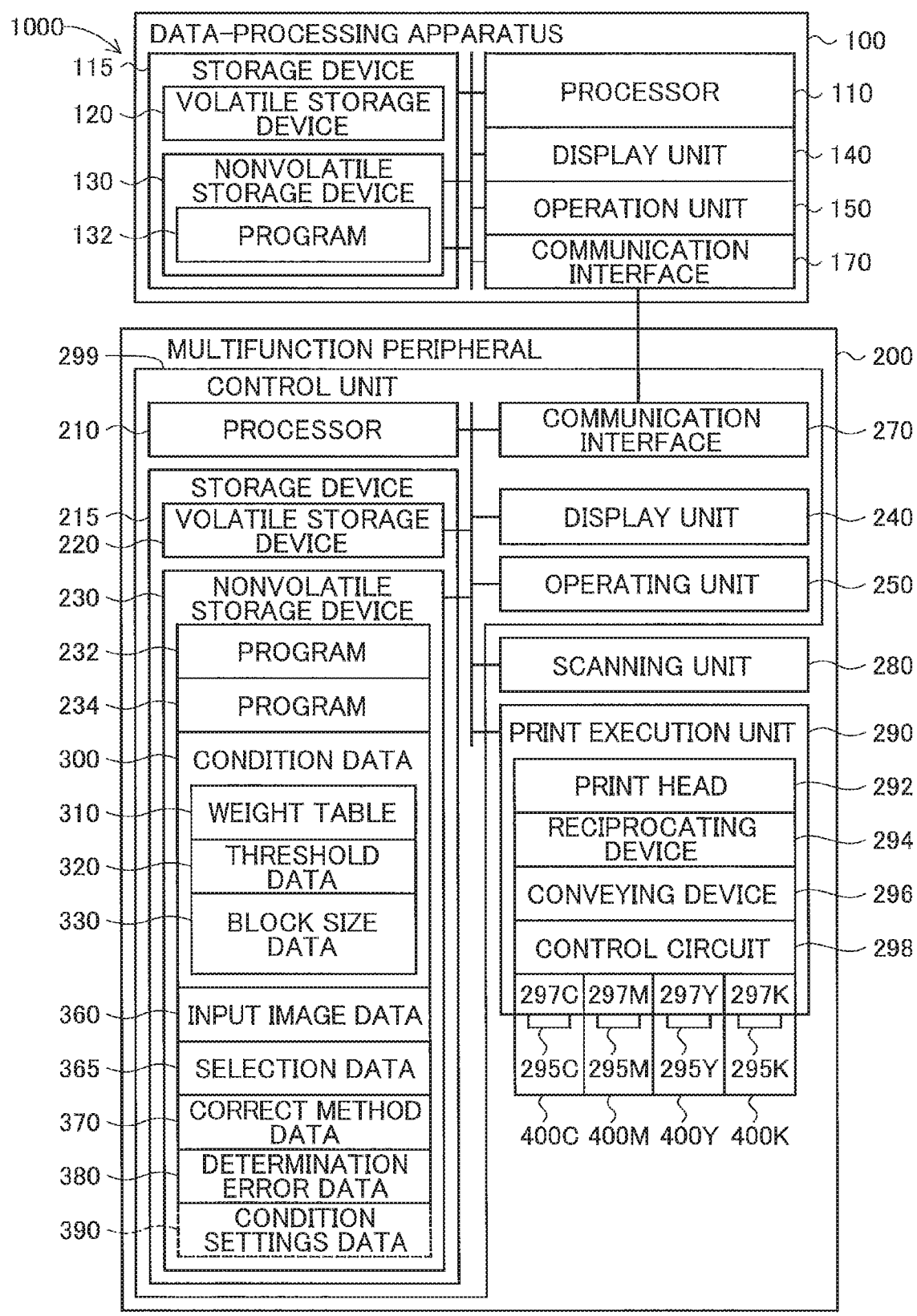
FIG. 1 is a block diagram illustrating an image-processing system including a data-processing apparatus and a multifunction peripheral according to a first embodiment of the present disclosure.

FIG. 1 is a block diagram illustrating an image-processing system 1000 according to the present embodiment. The image-processing system 1000 includes a data-processing apparatus 100, and a multifunction peripheral 200.

The multifunction peripheral 200 has: a control unit 299; a scanning unit 280; and a print execution unit 290. The control unit 299 has: a processor 210; a storage device 215; a display unit 240 that displays images; an operating unit 250 that accepts user operations; and a communication interface 270. All of these components are interconnected via a bus. The storage device 215 includes: a volatile storage device 220; and a nonvolatile storage device 230.

The processor 210 is a device for processing data, such as a central processing unit (CPU). The volatile storage device 220 is a dynamic random access memory (DRAM), for example. The nonvolatile storage device 230 is a flash memory, for example.

The nonvolatile storage device 230 stores programs 232 and 234, condition data 300, input image data 360, selection data 365, correct method data 370, and determination error data 380. The condition data 300 includes: a weight table 310; threshold data 320; and block size data 330. By executing the programs 232 and 234, the processor 210 implements various functions. The functions implemented by the processor 210 and the data 300, 360, 365, 370, and 380 will be described later in greater detail. The processor 210 temporarily stores various intermediate data used when executing the programs 232 and 234 in a storage device, such as the volatile storage device 220 or nonvolatile storage device 230. Note that condition settings data 390 may also be stored in the nonvolatile storage device 230. Condition settings data 390 is used in the second embodiment described later.

The display unit 240 is a device that displays images, such as a liquid crystal display. The operation unit 250 is a device that accepts user operations, such as a touch panel superimposed on the display unit 240. A user can input various commands to the multifunction peripheral 200 by operating the operation unit 250.

The communication interface 270 is an interface capable of communicating with other devices, such as a USB interface, a wired LAN interface, or the IEEE 802.11 wireless interface. In the present embodiment, the data-processing apparatus 100 is connected to the communication interface 270.

The scanning unit 280 optically reads an object such as an original using a photoelectric conversion element, such as a charge-coupled device (CCD) or a complementary metal oxide semiconductor (CMOS), to thereby generate scan data representing a read image (referred to as "scan image"). The scan data is RGB bitmap data representing a color scan image, for example.

The print execution unit 290 is an inkjet printing device that prints images on paper (an example of the printing medium) using ink in the four colors cyan (C), magenta (M), yellow (Y), and black (K). The print execution unit 290 has: a print head 292 (hereinafter simply called the "head 292"); a reciprocating device 294; a conveying device 296; mounting units 297C, 297M, 297Y, and 297K; and a control circuit 298. The control circuit 298 is an electric circuit configured to control each component of the print execution unit 290. The control circuit 298 may include a computer. Cartridges 400C, 400M, 400Y, and 400K accommodating ink in the respective colors cyan (C), magenta (M), yellow (Y), and black (K) are mounted in the corresponding mounting units 297C, 297M, 297Y, and 297K. The mounting units 297C, 297M, 297Y, and 297K are respectively provided with switches 295C, 295M, 295Y, and 295K for detecting the corresponding cartridges 400C, 400M, 400Y, and 400K. Note that the combination of ink colors used by the multifunction peripheral 200 is not limited to cyan, magenta, yellow, and black; various other combinations of colors may be used (cyan, magenta, and yellow, for example).

The multifunction peripheral 200 functions to control the print execution unit 290 to print images based on image data supplied by the user. The multifunction peripheral 200 can also function to control the print execution unit 290 to print images based on print data supplied from another device, such as the data-processing apparatus 100.

The data-processing apparatus 100 is a personal computer, such as a desktop computer or a tablet computer. The data-processing apparatus 100 has: a processor 110, such as a CPU; a storage device 115; a display unit 140 that displays images; an operating unit 150 that accepts user operations; and a communication interface 170. All of these components are interconnected via a bus. The storage device 115 includes: a volatile storage device 120, such as a DRAM; and a nonvolatile storage device 130, such as a flash memory. The nonvolatile storage device 130 stores a program 132. By executing the program 132, the processor 110 implements various functions. The functions implemented by executing the program 132 will be described later in greater detail. The communication interface 170 is an interface capable of communicating with other devices. The communication interface 270 of the multifunction peripheral 200 is connected to the communication interface 170.

Figure 2A:
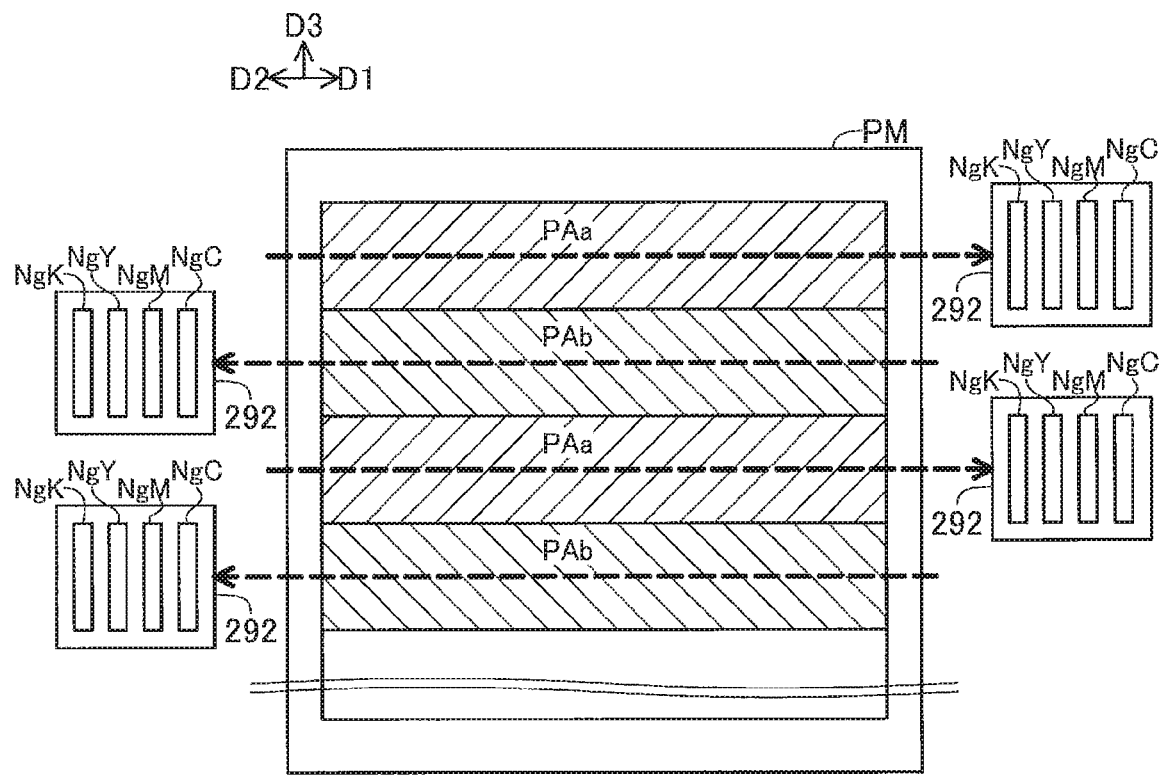
FIG. 2A is an explanatory diagram illustrating partial areas on a sheet of paper, and moving directions for a print head of a print execution unit in the multifunction peripheral.

FIG. 2A is an explanatory diagram illustrating partial areas PAa and PAb on a sheet PM of paper, and moving directions for the head 292. In FIG. 2A, a first direction D1 and a second direction D2 represent main scanning directions. The second direction D2 is the direction opposite to the first direction D1. The reciprocating device 294 (see FIG. 1) functions to reciprocate the head 292 in the main scanning directions. While not illustrated in the drawings, the reciprocating device 294 includes rails that support the head 292 so that the head 292 can slide in the main scanning directions, a plurality of pulleys, a belt that is looped around the pulleys and has a part fixed to the head 292, and a motor that rotates the pulleys, for example. When the motor rotates the pulleys, the head 292 moves in the main scanning directions.

A third direction D3 in FIG. 2 denotes a sub-scanning direction (hereinafter called the "sub-scanning direction D3"). The conveying device 296 (see FIG. 1) functions to convey the sheet PM in the sub-scanning direction D3 relative to the head 292. While not illustrated in the drawings, the conveying device 296 has a base for supporting the sheet PM in a position facing the head 292, upstream rollers disposed on the upstream side of the head 292, downstream rollers disposed on the downstream side of the head 292, and a motor that rotates these rollers. When rotated, the rollers convey the sheet PM in the sub-scanning direction D3. In the present embodiment, the sub-scanning direction D3 is orthogonal to the main scanning directions D1 and D2. In the following description, directions D1, D2, and D3 in which the print execution unit 290 moves relative to an image when the print execution unit 290 is printing the image will be used as directions relative to the image.

Figure 2B:
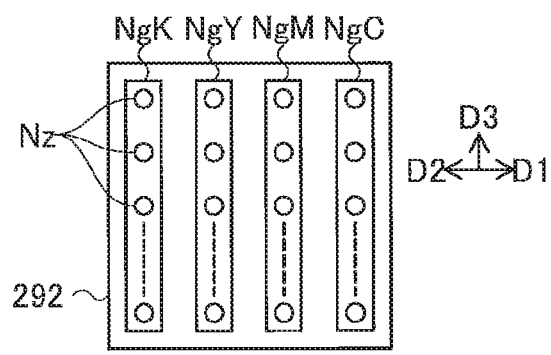
FIG. 2B is an explanatory diagram illustrating the layout of nozzles in the bottom surface of the print head.

FIG. 2B is an explanatory diagram illustrating the layout of nozzles in the bottom surface of the head 292. As illustrated in FIG. 2B, nozzle groups NgC, NgM, NgY, and NgK for ejecting ink in the corresponding colors cyan, magenta, yellow, and black are formed in the bottom surface of the head 292. Each nozzle group has a plurality of nozzles Nz arranged at different positions along the sub-scanning direction D3. In the present embodiment, each of the nozzles Nz in a nozzle group has the same position along the main scanning directions. However, the nozzles Nz included in a nozzle group may be arranged at different positions in the main scanning direction. In the present embodiment, the four nozzle groups NgC, NgM, NgY, and NgK are juxtaposed along the main scanning direction (the second direction D2 in this case) in the order given. The nozzle groups NgC, NgM, NgY, and NgK are respectively connected to mounting units 297C, 297M, 297Y, and 297K (see FIG. 1) by ink supply channels (not illustrated).

As illustrated in FIG. 2A, the print execution unit 290 (see FIG. 1) forms ink dots on the sheet PM by ejecting ink droplets toward the sheet PM from the nozzles Nz in the nozzle groups NgC, NgM, NgY, and NgK while moving the head 292 in the main scanning directions D1 and D2. Through this process, an image is printed in a single band-like partial area (the partial area PAa or PAb, for example) extending over the sheet PM in the main scanning directions D1 and D2. The image printed in one partial area will be called a "partial image." After printing a partial image, the print execution unit 290 conveys the sheet PM in the sub-scanning direction D3. The distance that the sheet PM is conveyed (the feed amount) in the present embodiment is equivalent to the width in the sub-scanning direction D3 of one of the partial areas PAa and PAb. Images are printed over the entire sheet PM by repeatedly alternating between printing a single partial image and feeding the sheet PM.

The process of printing a partial image by moving the head 292 in a main scanning direction while ejecting ink droplets onto a single partial area of the sheet PM will be called a "partial print," or a "pass." The direction in which the head 292 is moved in a partial print will be called the "printing direction." The first direction D1 will be also called the "forward direction D1" and the second direction D2 will be also called the "reverse direction D2." A partial area will be called a "band area," and a partial image will be called a "band image."

The partial area PAa in FIG. 2A is an area in which a partial image is printed through a partial print in the forward direction D1, and will be called a "forward print area PAa." The partial area PAb is an area in which a partial image is printed through a partial print in the reverse direction D2, and will be called a "reverse print area PAb." In the example of FIG. 2A, the forward print areas PAa and reverse print areas PAb are juxtaposed alternately in the sub-scanning direction D3. By using the head 292 to print partial images while moving in both the forward direction D1 and reverse direction D2, printing can be performed quickly. However, there are cases in which a plurality of partial prints are executed consecutively in the same printing direction, as will be described later.

Figure 2C:
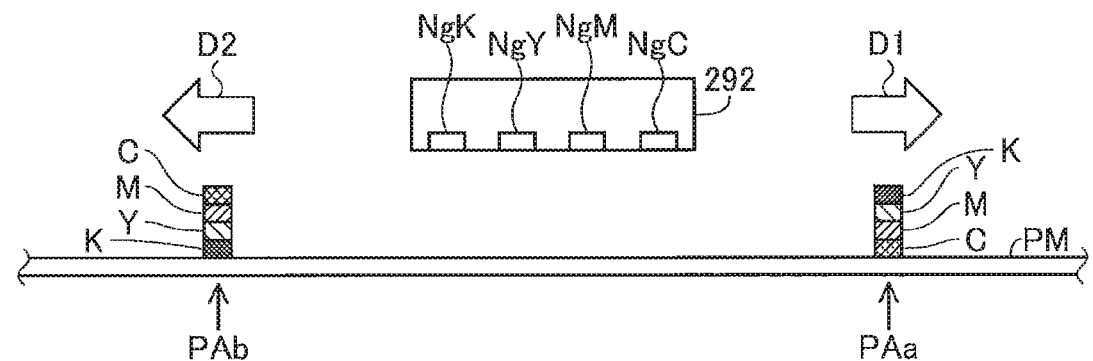
FIG. 2C is an explanatory diagram illustrating the print head and the sheet when viewed in a sub-scanning direction and illustrating an ink overlaying order on the sheet.

FIG. 2C is an explanatory diagram illustrating the head 292 and the sheet PM when viewed in the sub-scanning direction D3 and illustrates the ink overlaying order on the sheet PM. As illustrated on the right side of the drawing, the ink overlaying order in a forward print area PAa is the order C, M, Y, and K progressing upward from the sheet PM. As illustrated on the left side of the drawing, the ink overlaying order in a reverse print area PAb is the order K, Y, M, and C progressing upward from the sheet PM. Thus, the ink overlaying order for a partial print in the reverse direction D2 is opposite to the ink overlaying order for a partial print in the forward direction D1.

If the ink overlaying order differs between two printed colors, the two colors may appear different, even when the types of overlapping inks and the quantities per unit area of each ink type are the same. For example, the color of the forward print area PAa may appear different from the color of the reverse print area PAb in FIG. 2C. Such a difference in color caused by different printing directions (i.e., a color difference caused by the difference in the order that ink is superposed) is also called a "printing direction color difference" or simply a "directional color difference."

FIG. 3A is an explanatory diagram for the weight table 310 (see FIG. 1). A color solid CC expressed in RGB color components is illustrated in the left side of FIG. 3A. A symbol representing a color is assigned to each of the eight vertices in the color solid CC. Specifically, the color solid CC has a black vertex Vk (0, 0, 0), a red vertex Vr (255, 0, 0), a green vertex Vg (0, 255, 0), a blue vertex Vb (0, 0, 255), a cyan vertex Vc (0, 255, 255), a magenta vertex Vm (255, 0, 255), a yellow vertex Vy (255, 255, 0), and a white vertex Vw (255, 255, 255). The numbers in parentheses indicate the values of the color components (red R, green G, blue B). The R value at each grid point GD is set to one of Q+1 values obtained by dividing the range of R values (between 0 and 255 in this example) into Q equal parts (hence, Q is 9, 17, etc.). The G values and B values are similarly set for each of the grid points GD.

The right side of FIG. 3A illustrates an example of the weight table 310. The weight table 310 specifies correlations between RGB color values 311, and weights W. The weight table 310 is an example of the correlation data of the present disclosure. The RGB color values 311 include the color values (combinations of gradation values for RGB color components in this case) for each of the grid points GD described above. The weights W represent evaluation values for the directional color difference described above. More specifically, a single set of RGB color values is correlated with a single weight W in the weight table 310, and the weight W represents an expected value of the directional color difference (an expected color difference) between a first image printed according to the single set of RGB color values by a partial print in the forward direction D1 and a second image printed according to the single set of RGB color values by a partial print in the reverse direction D2. The weight W is set larger for larger directional color difference. The weight W is an example of the color evaluation value of the present disclosure.

The initial values of the weights W are determined experimentally in the present embodiment. The weights W are subsequently adjusted in an adjustment process described later. As an example, the initial value for a weight W is determined as follows. A first patch is printed through a partial print in the forward direction D1 based on the color values of a grid point GD in the color solid CC, and a second patch is printed through a partial print in the reverse direction D2 based on the same color values. Each patch has a uniform color region represented by a single set of RGB color values. Correlations are preset between RGB color values and quantities of CMYK ink per unit area. While both patches for a single grid point GD share the same quantities per unit area of CMYK ink, the overlaying order of CMYK ink is opposite. Owing to this difference in ink overlaying order, a user visually examining the two patches may notice a difference in color between the patches. According to colorimetric values obtained by measuring the two patches (color values in the L*a*b* color space, for example), a color difference (distance in the CIELab color space) is identified. The initial value of the weight W is set larger for larger color differences. For example, the initial value for the weight W may be set to a value obtained by multiplying the color difference by a prescribed coefficient.

Figure 4:
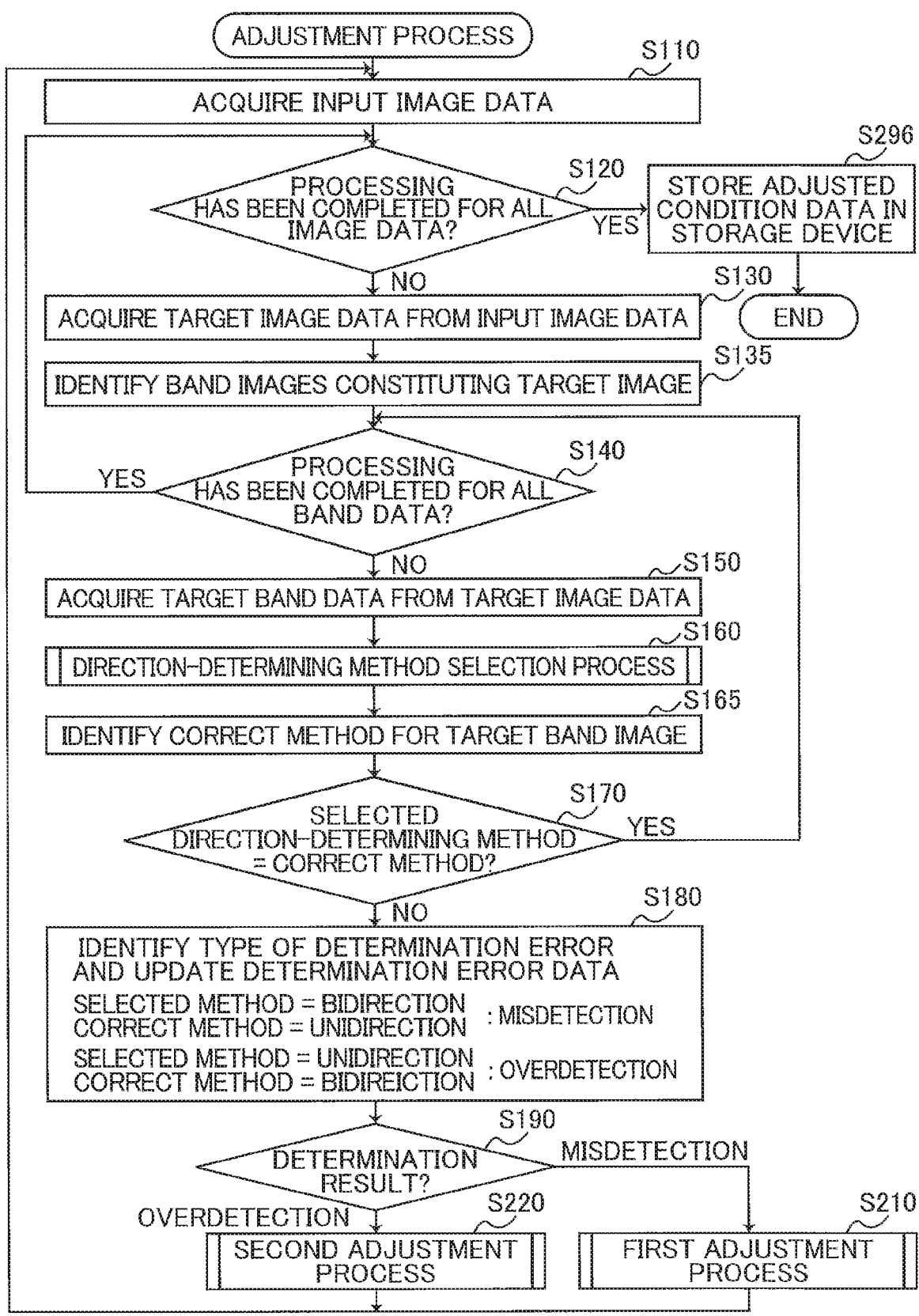
FIG. 4 is a flowchart illustrating steps in an example of an adjustment process executed by a processor of the multifunction peripheral according to the first embodiment of the present disclosure.

FIG. 4 is a flowchart illustrating steps in an example of the adjustment process. In the present embodiment, the processor 210 of the multifunction peripheral 200 (see FIG. 1) executes the process in FIG. 4 according to the program 232. The processor 210 begins the process in FIG. 4 when the user inputs a command through the operating unit 250. The condition data 300 specifying initial values of weights W is stored in the nonvolatile storage device 230 of the multifunction peripheral 200 for this adjustment process.

In S110 of FIG. 4, the processor 210 acquires the input image data 360 from the nonvolatile storage device 230. The input image data 360 is image data that has been prepared for the adjustment process. The input image data 360 includes image data for N number of images (where N is an integer greater than or equal to one). It will be assumed that one image is printed on one sheet. Thus, an image to be printed on one sheet will be called a "full-page image." The image data in the present embodiment is bitmap data and specifies pixel values for each pixel in the image data. The pixel values are expressed as one of 256 gradations from 0 to 255 for each of the components red (R), green (G), and blue (B). If the image data has a format other than the bitmap format (Enhanced Metafile (EMF) format, for example), the processor 210 converts the data format (rasterizes the data, for example) to generate bitmap data, and uses the resulting bitmap data as the image data. Further, when the pixel density of the image data differs from a prescribed pixel density for the printing process, the processor 210 executes a process to convert the pixel density of the image data to the pixel density for the printing process.

In S120 the processor 210 determines whether the process described below has been performed for all image data in the input image data 360 (i.e., on image data for all full-page images). When there remains unprocessed image data (S120: NO), in S130 the processor 210 acquires unprocessed image data for one full-page image from the input image data 360. This page-worth of image data will be called the "target image data," and the image represented by the target image data will be called the "target image." In S135 the processor 210 identifies a plurality of band images (see FIG. 2A) constituting the target image represented by the target image data. In the following description, a portion of the target image data representing a band image will be called "partial image data" or "band data."

Figure 5:
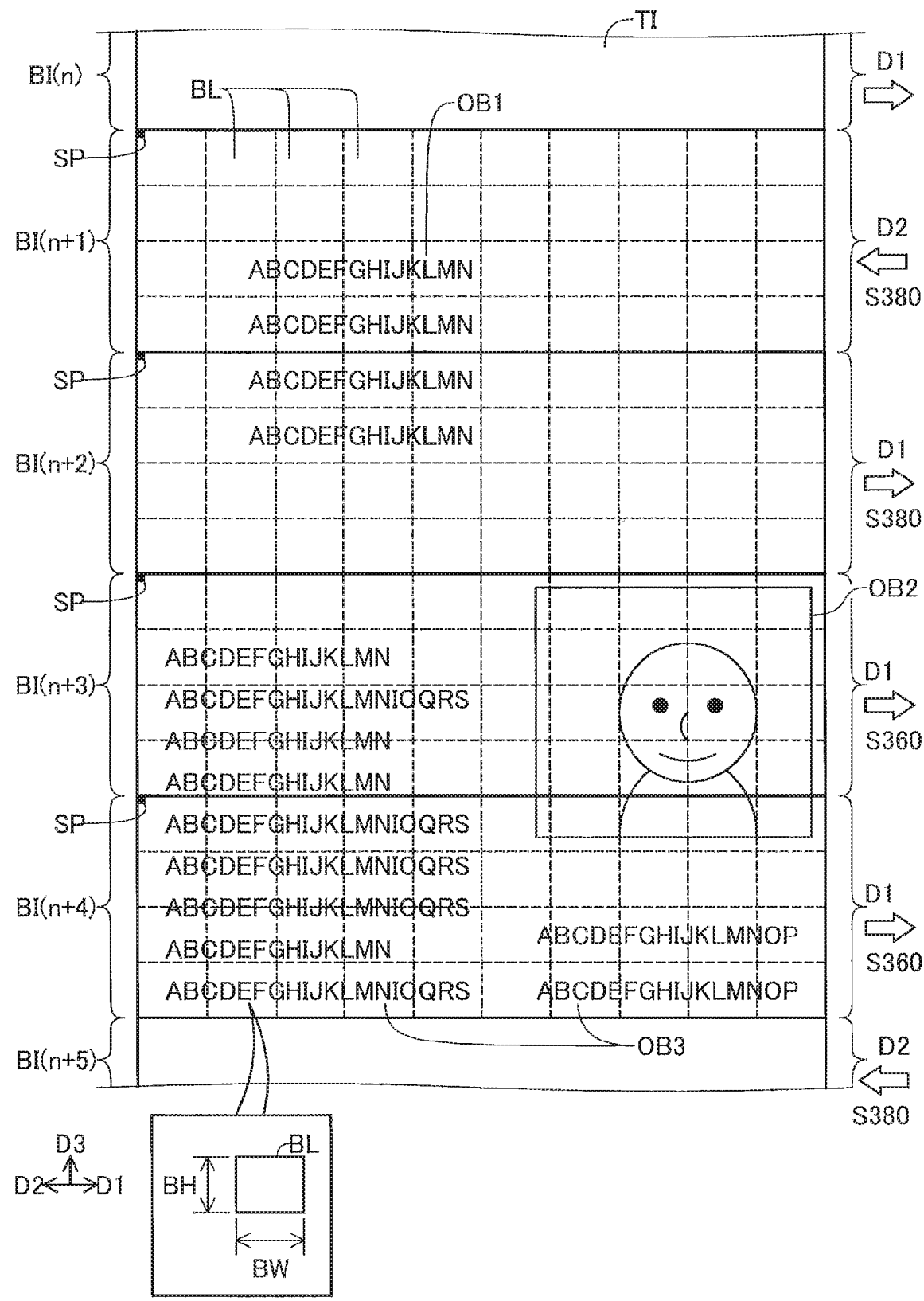
FIG. 5 is an explanatory diagram illustrating an example of a plurality of band images constituting a target image and a plurality of blocks constituting each band image.

FIG. 5 is an explanatory diagram illustrating an example of a plurality of band images. The diagram illustrates part of a sample target image TI, and indicates the directions D1, D2, and D3. The target image TI depicts three objects OB1, OB2, and OB3. The first object OB1 and the third object OB3 are text objects (i.e., character strings). The second object OB2 is a photograph. The portion of the target image TI illustrated in FIG. 5 includes n-th through (n+5)-th band images BI(n) through BI(n+5) (where n is an integer greater than or equal to one). When not differentiating between individual band images in the following description, the band images will simply be called band images BI. In the present embodiment, the target image TI is divided into a plurality of band images BI juxtaposed in the sub-scanning direction D3. The shape and size of each band image BI and its position on the sheet PM (see FIG. 2A) are predetermined. The processor 210 identifies a plurality of band images BI constituting the target image TI according to the position of the target image TI on the sheet PM. As an alternative, the processor 210 may lay out a plurality of band images BI with no spacing therebetween, beginning from the downstream end of the target image TI in the sub-scanning direction D3 and progressing in the direction opposite to the sub-scanning direction D3. When a target image TI is printed, the band images BI are printed in order one at a time in the direction opposite to the sub-scanning direction D3.

In S140 of FIG. 4, the processor 210 determines whether all band data constituting the target image data has been processed. If processing has been completed for all band data (S140: YES), the processor 210 returns to S120.

When there remains unprocessed band data (S140: NO), in S150 the processor 210 acquires one set of unprocessed band data from the plurality of sets of band data included in the target image data to be used as target band data. In the following description, an image represented by the target band data will be called a "target partial image" or a "target band image." In the present embodiment, the processor 210 acquires band data in a printing order (i.e., one set of band data at a time in order along the opposite direction of the sub-scanning direction D3).

In S160 the processor 210 executes a determination method selection process for selecting a method of determining the printing direction for the target band image. Hereinafter, this process will be called the "process for selecting the direction-determining method" or "direction-determining method selection process." FIG. 6 is a flowchart illustrating steps in the direction-determining method selection process. In S310 the processor 210 identifies a plurality of blocks in the target band image. FIG. 5 illustrates the blocks BL constituting each band image BI. As illustrated in the bottom left of FIG. 5, each block BL has a rectangular shape. A height BH of the block BL in the sub-scanning direction D3 and a width BW in the main scanning directions D1 and D2 are preset (in units of pixels, for example) by the block size data 330 (see FIG. 1). In the present embodiment, the blocks BL are arranged along the main scanning directions D1 and D2 and sub-scanning direction D3 in the band image BI to form a grid configuration with no gaps between blocks BL, so that the upper-left corner of one block BL overlaps an upper-left corner SP (i.e., the corner on the upstream side in the main scanning direction D2 and the downstream side in the sub-scanning direction D3) of the band image BI.

In S320 of FIG. 6, the processor 210 acquires data for one block BL to be subjected to processing from the target band data. As will be described below, the blocks BL included in the target band image are processed one at a time in order. The order for selecting blocks BL is predetermined. For example, blocks BL are selected in order from a single row of blocks BL aligned in the first direction D1, beginning from the block BL on the downstream end in the second direction D2 (on the upstream end in the first direction D1) and progressing one at a time in the first direction D1. The rows of blocks BL are selected in order from the plurality of rows juxtaposed in the third direction D3 within the target band image, beginning from the row of blocks on the downstream side in the third direction D3 and progressing one row at a time in the direction opposite to the third direction D3. In S320 the processor 210 acquires data for the first block BL. Hereinafter, the block BL being subjected to processing will be called the "target block," and the data for the target block will be called the "target block data." Note that the blocks BL may be selected in various other orders. For example, a process for selecting blocks BL in order beginning from the block BL on the downstream end in the third direction D3 and progressing one at a time in the direction opposite to the third direction D3 may be repeatedly performed beginning from the column of blocks BL on the downstream side in the second direction D2 (on the upstream side in the first direction) and progressing one column at a time in the first direction D1.

In S330 the processor 210 determines whether the target block is an empty block. The target block is determined to be an empty block when all pixel values for the plurality of pixels in the target block fall within a prescribed color range representing the background (for example, pixel values within a prescribed color range that includes white).

When the target block is determined to be an empty block (S330: YES), the processor 210 advances to S370 without calculating an evaluation value for the target block, as will be described later. In S370 the processor 210 determines whether all blocks BL in the target band image have been processed. If there remain unprocessed blocks (S370: NO), in S375 the processor 210 acquires data for the next unprocessed block BL as the target block data and returns to S330.

When all blocks BL in the target band image have been processed (S370: YES), in S380 the processor 210 selects a bidirectional method, and advances to S390. The bidirectional method sets the printing direction for the target band to the direction opposite to the printing direction for the preceding band.

When the processor 210 determines in S330 that the target block is not an empty block (S330: NO), at least part of an object is present in the target block. Therefore, in S340 the processor 210 references the weight table 310 (see FIG. 3A) to calculate a block evaluation value BV for the target block. That is, the processor 210 identifies the weight in the weight table 310 that is associated with the pixel values for each pixel in the target block. If pixel values are positioned between grid points GD in the color solid CC, the weight W for the grid point GD closest to these pixel values is used as the weight. Alternatively, the weight may be calculated through interpolation (tetrahedral interpolation, for example) using a plurality of grid points GD near the pixel value. The processor 210 calculates the block evaluation value BV to be the average value of weights for the plurality of pixels in the target block. The block evaluation value BV is an evaluation value for the directional color difference described in FIG. 2C. A large block evaluation value BV signifies a large directional color difference. In other words, if the target block is printed twice using a partial print in the forward direction D1 and then a partial print in the reverse direction D2 and an observer compares the colors of the two printed images, the difference in color perceived by the observer (i.e., the directional color difference) is greater when the block evaluation value BV is larger.

In S350 the processor 210 determines whether the block evaluation value BV is greater than or equal to a block evaluation value threshold BVt. The block evaluation value threshold BVt is predetermined according to the threshold data 320 (see FIG. 1). When the block evaluation value BV is less than the block evaluation value threshold BVt (S350: NO), the processor 210 advances to S370 described above.

However, when the block evaluation value BV is greater than or equal to the block evaluation value threshold BVt (S350: YES), in S360 the processor 210 selects a unidirectional method and advances to S390. The unidirectional method sets the printing direction for the target band to a predetermined direction (the forward direction D1 in the present embodiment), irrespective of the printing direction used for the preceding band in the printing order.

In S390 the processor 210 records data specifying the direction-determining method selected in S360 or S380 in the nonvolatile storage device 230 (see FIG. 1). The selection data 365 is data specifying the direction-determining method. The processor 210 records a direction-determining method in the selection data 365 for each band in the N number of full-page images.

An example of the direction-determining methods and printing directions is illustrated in FIG. 5 on the right side of each band image BI. In this example, band images BI(n+1) and BI(n+2) include only text objects. In such band images BI(n+1) and BI(n+2), the block evaluation value BV in each block BL is less than the block evaluation value threshold BVt. As a result, the bidirectional method is selected as the direction-determining method for the band images BI(n+1) and BI(n+2) (S380). When the printing direction is set according to the selected direction-determining method, the printing direction for the band image BI(n+1) is set to the direction opposite to the printing direction for the preceding band image BI(n) (the reverse direction D2 in this case). The printing direction for the band image BI(n+2) is set to the direction opposite to the printing direction in the preceding band image BI(n+1) (the forward direction D1 in this case). Since these band images are printed by moving the head 292 in both the reverse direction D2 and the forward direction D1, the time required for printing can be reduced.

The band images BI(n+3) and BI(n+4) include an object of a different type than text (the second object OB2; a photograph in this case). In most cases, such band images BI(n+3) and BI(n+4) include blocks BL having a block evaluation value BV greater than or equal to the block evaluation value threshold BVt. Thus, the unidirectional method may be selected as the direction-determining method for the band images BI(n+3) and BI(n+4) (S360). When the printing direction is set according to the selected direction-determining method, the printing directions for the band images BI(n+3) and BI(n+4) are set to a predetermined direction (the forward direction D1 in the present embodiment), thereby suppressing color variation (color variation in the second object OB2 in this example). Thus, after performing the partial print for the band image BI(n+3), the head 292 is moved in the reverse direction D2 before performing the partial print for the band image BI(n+4).

The process of FIG. 6, and hence the process in S160 of FIG. 4, ends upon completion of step S390 in FIG. 6. In S165 the processor 210 references the correct method data 370 (see FIG. 1) to identify the correct method for the target band image. FIG. 3B is an explanatory diagram illustrating an example of the correct method data 370. The correct method data 370 specifies correlations between image numbers, pass numbers, and correct methods. The image numbers are numbers for identifying the N number of full-page images represented by the input image data 360 and are integers beginning from one in the present embodiment.

Pass numbers are numbers identifying each of the band images (i.e., partial images) in one full-page image. In the present embodiment, pass numbers are identical to the printing order for band images in one image and are integers beginning from one. The correct method is the correct choice for the direction-determining method to be used for determining the printing direction of the corresponding pass. In the example of FIG. 3B, the correct method for the first band image in the first image is the unidirectional method.

The weight table 310 in the present embodiment is adjusted using the input image data 360 in order to improve printing speed while suppressing color variation when printing images of various types. To achieve this, data representing a variety of images is prepared as the input image data 360. The input image data 360 represents a plurality of images for objects of different types. The correct method data 370 is determined experimentally in advance for improving printing speed while suppressing color variation when the print execution unit 290 prints each image.

In S170 of FIG. 4, the processor 210 determines whether the direction-determining method selected in S160 is the same as the correct method. When the direction-determining method and correct method are the same (S170: YES), the processor 210 returns to S140 and processes another band image.

When the selected direction-determining method is different from the correct method (S170: NO), in S180 the processor 210 identifies the type of incorrect choice (hereinafter called "determination error") for the direction-determining method. One type of determination error will be called "misdetection." This error occurs when the unidirectional method is the correct method but is not detected according to the weight table 310, resulting in the bidirectional method being selected. Another type of determination error will be called "overdetection." This error occurs when the unidirectional method is incorrectly selected according to the weight table 310.

In S180 the processor 210 updates the determination error data 380 (see FIG. 1) with the type of determination error. FIG. 3C is an explanatory diagram illustrating an example of the determination error data 380. The determination error data 380 specifies correlations between image numbers, determination results, and pass numbers. The image numbers are identical to the image numbers described in FIG. 3B. The determination result indicates the possible types of determination error (misdetection or overdetection). The pass number is the pass number of the band image that has induced the determination error. The processor 210 updates the determination error data 380 adding the pass number for the target band image so that the pass number is correlated with the image number for the target image and the determination result (i.e., the determination error) induced by the target band image. In the example of FIG. 3C, the second band image in the first full-page image has induced the overdetection determination error.

In S190 of FIG. 4, the processor 210 branches to one of a first adjustment process and a second adjustment process according to the type of determination error that occurred. Hence, if the type of determination error is "misdetection" (S190: MISDETECTION), in S210 the processor 210 adjusts the weight table 310 according to the first adjustment process, and subsequently returns to S110. In S210 the processor 210 adjusts the weights W in the weight table 310 (see FIG. 3A) to larger values to suppress future misdetection determination errors. If the type of determination error is "overdetection" (S190: OVERDETECTION), in S220 the processor 210 adjusts the weight table 310 in the second adjustment process, and subsequently returns to S110. In S220 the processor 210 adjusts the weights W in the weight table 310 to smaller values in order to suppress future overdetection determination errors.

FIG. 7 is a flowchart illustrating an example of the first adjustment process in S210 of FIG. 4. In S510 of the first adjustment process, the processor 210 references the determination error data 380 (see FIG. 3C) and selects the band image (i.e., the partial image) that has induced a misdetection determination error and sets this band image as the target band image. FIGS. 8A through 8D are explanatory diagram for the first adjustment process, and FIG. 8A illustrates a target band image BI(k).

In S520 the processor 210 identifies the block in the target band image having the largest block evaluation value BV, and sets this block as the target block. In the example of FIG. 8, a block BL1 will serve as the target block (hereinafter called the "target block BL1"). In S520 the processor 210 may identify the target block by calculating the block evaluation value BV for each block BL or by using the block evaluation values BV calculated in S340 of FIG. 6.

In S550 the processor 210 identifies target pixels having a weight that exceeds a first threshold Wt1 from among the plurality of pixels PX in the target block. The first threshold Wt1 is preset in the threshold data 320 (see FIG. 1). The processor 210 then increases the weights in the weight table 310 for grid points referenced in order to calculate the weight of each of the target pixels. FIG. 8B illustrates two pixels Px1 and Px2 as sample pixels in the target block BL1. The first pixel Px1 has RGB values 190, 128, and 64 and a weight W of 80. The second pixel Px2 has RGB values 192, 208, and 240 and a weight W of 10.

The graph in FIG. 8D includes graph lines G1 through G3 depicting correlations between the unadjusted weight Wi and the adjusted weight Wo. The weight W is between zero and the maximum value Wm. In the present embodiment, weights W can be adjusted a plurality of times until the determination error is resolved. The graph lines G1 through G3 depict correlations used in the first through third adjustments, respectively. For all of the graph lines G1 through G3, the adjusted weight Wo is equivalent to the unadjusted weight Wi when the unadjusted weights Wi is less than or equal to a first threshold Wt1 on the corresponding graph lines G1 through G3; and the adjusted weight Wo is greater than the unadjusted weight Wi when the unadjusted weight Wi exceeds the first threshold Wt1 on the corresponding graph lines G1 through G3. The adjusted weight Wo grows larger as the unadjusted weight Wi grows larger. The first threshold Wt1 may be any of various values, including zero or a value greater than zero. The adjusted weight Wo and unadjusted weight Wi may have any of various relationships in the range of unadjusted weights Wi exceeding the first threshold Wt1. In the present embodiment, the adjusted weight Wo is proportional to the unadjusted weight Wi in the range of unadjusted weights Wi exceeding the first threshold Wt1. Additionally, the adjusted weights Wo are set larger each time the adjustment is repeated.

Specifically, in the first execution of S550, the processor 210 adjusts the weights W in the weight table 310 according to the graph line G1 (see FIG. 8D). For example, the weight of a first grid point GD1 referenced for the first pixel Px1 (see FIG. 8C) is adjusted from 80 to 81 according to the graph line G1. The weight of a second grid point GD2 referenced for the second pixel Px2 is also adjusted according to the graph line G1. However, the adjusted weight for the second grid point GD2 in the example of FIG. 8C is the same as the unadjusted weight of 10. In this way, the adjusted weight remains equivalent to the unadjusted weight when the unadjusted weight is small. Further, if a plurality of grid points is referenced to calculate the weight of a target pixel, the weights for the plurality of grid points are adjusted.

In S560 of FIG. 7, the processor 210 executes the direction-determining method selection process. The direction-determining method selection process in S560 is performed according to the same steps described in FIG. 6 using the adjusted weight table 310. Since the weights of a plurality of grid points have been increased in the adjusted weight table 310 through the process of S550, the block evaluation value BV calculated in S340 of FIG. 6 can be increased. Consequently, the misdetection determination error may have been eliminated.

S565 and S570 of FIG. 7 are identical to the corresponding steps S165 and S170 in FIG. 4. When the direction-determining method selected in S560 differs from the correct method (S570: NO), ordinarily the misdetection determination error has not been resolved for the same target band image. In this case, the processor 210 in the present embodiment returns to S510 and readjusts the weight table 310. In the second adjustment according to the graph line G2 (S550), the adjusted weights can be increased over the first adjusted weights. In the third adjustment according to the graph line G3 (S550), the adjusted weights can be increased over the second adjusted weights. By repeatedly adjusting weights in this way, the misdetection determination error can be resolved. For example, by performing three adjustments, the weight of the first grid point GD1 in FIG. 8C is changed sequentially to 81, 82, and 82. In the present embodiment, weights are expressed as integers. If performing adjustments an increasing number of times only results in a small increase in weight (an increase of less than 1, for example), the weight may remain the same even after repeatedly performing adjustments.

On the other hand, if the direction-determining method selected in S560 of FIG. 7 is the same as the correct method (S570: YES), in S580 the processor 210 updates the determination error data 380 (see FIG. 3C) by deleting the pass number for the target band image. Subsequently, the processor 210 ends the process in FIG. 7 and, hence, the process in S210 of FIG. 4. In the present embodiment, an upper limit is preset for the number of adjustments that can be performed on the weight table 310 in a single first adjustment process (S210). For example, the upper limit may be three. Although not illustrated in FIG. 7, once the number of adjustments has reached the upper limit, the processor 210 ends the first adjustment process even if the determination error has not been resolved.

Figure 9:
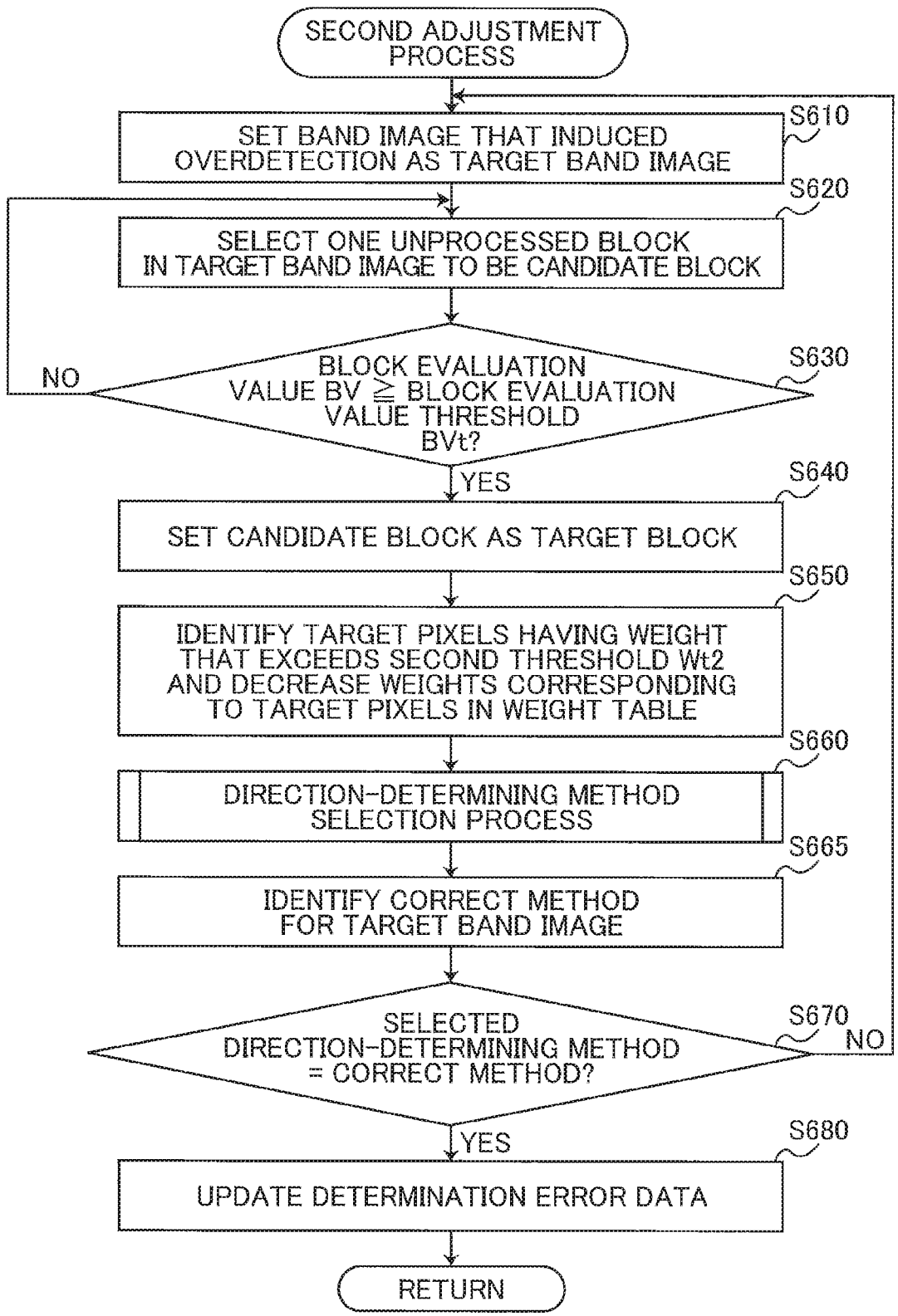
FIG. 9 is a flowchart illustrating steps in an example of a second adjustment process executed by the processor of the multifunction peripheral according to the first embodiment of the present disclosure.

FIG. 9 is a flowchart illustrating steps in an example of the second adjustment process of S220 (FIG. 4). In S610 of the second adjustment process, the processor 210 references the determination error data 380 (see FIG. 3C) and selects the band image (i.e., partial image) that has induced an overdetection determination error and sets this band image as the target band image. FIGS. 10A through 10D are explanatory diagrams for the second adjustment process, and FIG. 10A illustrates a target band image BI(m).

In S620 the processor 210 selects one unprocessed block from among the plurality of blocks in the target band image to be a candidate block. Candidate blocks are selected in a predetermined order. In the present embodiment, the order for selecting candidate blocks is identical to the selection order of blocks described in S320 of FIG. 6.

In S630 the processor 210 determines whether the block evaluation value BV for the candidate block is greater than or equal to the block evaluation value threshold BVt. The processor 210 may make the determination in S630 by calculating the block evaluation value BV in S630 or by using the block evaluation values BV calculated in S340 of FIG. 6.

If the block evaluation value BV is smaller than the block evaluation value threshold BVt (S630: NO), the processor 210 returns to S620 and performs the same process on the next candidate block. However, if the block evaluation value BV is greater than or equal to the block evaluation value threshold BVt (S630: YES), in S640 the processor 210 sets the candidate block as the target block (i.e., the block being processed). The processor 210 then executes steps S650 through S665 described next using the target block. In FIG. 10A the processor 210 searches for target blocks in the target band image BI(m) in order beginning from the upper left block BL. In this example, a block BL2 will be used as the target block (hereinafter called the "target block BL2").

In S650 the processor 210 identifies target pixels among the plurality of pixels in the target block whose weight exceeds a second threshold Wt2. The second threshold Wt2 is preset according to the threshold data 320 (see FIG. 1). Next, the processor 210 decreases the weights W in the weight table 310 for grid points referenced in order to calculate the weight of each of the target pixels. FIG. 10B illustrates two pixels Px11 and Px12 as sample pixels in the target block BL2. The first pixel Px11 has RGB values 190, 128, and 64 and a weight W of 80. The second pixel Px12 has RGB values 192, 208, and 240 and a weight W of 10.

The graph in FIG. 10D includes graph lines G11 through G13 depicting correlations between the unadjusted weight Wi and the adjusted weight Wo. In the present embodiment, weights can be adjusted a plurality of times in order to eliminate determination error. The graph lines G11 through G13 depict correlations used in the first through third adjustments, respectively. For all of the graph lines G11 through G13, the adjusted weight Wo is equivalent to the unadjusted weight Wi when the unadjusted weights Wi is less than or equal to a second threshold Wt2 on the corresponding graph lines G11 through G13; and the adjusted weight Wo is smaller than the unadjusted weight Wi when the unadjusted weight Wi exceeds the second threshold Wt2 on the corresponding graph lines G11 through G13. The adjusted weight Wo grows larger as the unadjusted weight Wi grows larger. The second threshold Wt2 may be any of various values, including zero or a value greater than zero. The adjusted weight Wo and unadjusted weight Wi may have any of various relationships in the range of unadjusted weights Wi exceeding the second threshold Wt2. In the present embodiment, the adjusted weight Wo is proportional to the unadjusted weight Wi in the range of unadjusted weights Wi exceeding the second threshold Wt2. Additionally, the adjusted weights Wo are set smaller each time the adjustment is repeated.

Thus, in the first execution of S650, the processor 210 adjusts the weights W in the weight table 310 according to the graph line G11 (see FIG. 10D). For example, the weight of a first grid point GD11 referenced for the first pixel Px11 (see FIG. 10C) is adjusted from 80 to 79 according to the graph line G11. The weight of a second grid point GD12 referenced for the second pixel Px12 is also adjusted according to the graph line G11. As in the adjustment process illustrated in FIGS. 8A through 8D, the adjusted weight may remain equivalent to the unadjusted weight when the unadjusted weight is small. Further, if a plurality of grid points is referenced to calculate the weight of the target pixel, the weights for the plurality of grid points are adjusted.

In S660 of FIG. 9, the processor 210 executes the direction-determining method selection process. The direction-determining method selection process in S660 is performed according to the same steps described in FIG. 6 using the adjusted weight table 310. Since the weights of a plurality of grid points have been reduced in the adjusted weight table 310 through the process of S650, the block evaluation value BV calculated in S340 of FIG. 6 can be decreased. Accordingly, the overdetection determination error may have been eliminated.

Steps S665 and S670 of FIG. 9 are identical to the corresponding steps S165 and S170 of FIG. 4. When the direction-determining method selected in S660 differs from the correct method (S670: NO), ordinarily the overdetection determination error has not been resolved for the same target band image. In this case, the processor 210 in the present embodiment returns to S610 and readjusts the weight table 310. In the second adjustment according to the graph line G12 (S650), the adjusted weights can be made smaller than in the first adjustment. In the third adjustment according to the graph line G12 (S650), the adjusted weights can be made smaller than in the second adjustment. By repeatedly adjusting weights in this way, the overdetection determination error can be resolved. For example, by performing three adjustments, the weight of the first grid point GD11 in FIG. 10C is changed sequentially to 79, 78, and 78. As in the adjustment process of FIGS. 8A through 8D, if performing adjustments an increasing number of times only results in a small reduction in weight (a reduction of less than one, for example), the weight may remain the same even after repeatedly performing adjustments.

On the other hand, if the direction-determining method selected in S660 is the same as the correct method (S670: YES), in S680 the processor 210 updates the determination error data 380 (see FIG. 3C) by deleting the pass number for the target band image. Subsequently, the processor 210 ends the process in FIG. 9 and, hence, the process in S220 of FIG. 4. In the present embodiment, an upper limit is preset for the number of adjustments that can be performed on the weight table 310 in a single second adjustment process (S220). For example, the upper limit may be three times. Although not illustrated in FIG. 9, once the number of adjustments has reached the upper limit, the processor 210 ends the second adjustment process even if the determination error has not been resolved.

Returning to FIG. 4, in the adjustment process described above, the processor 210 adjusts the weight table 310 through the adjustment process in S210 or S220 in order to eliminate determination error when determination error has occurred (S170: NO). Thereafter, the processor 210 returns to S110 and repeats the adjustment process in FIG. 4 using the adjusted weight table 310. In this way, the adjusted weight table 310 can be further adjusted. When no determination error is found in the band images of all images in the input image data 360 (S170: YES, S140: YES, S120: YES), in S296 the processor 210 stores the adjusted condition data 300 including the adjusted weight table 310 (i.e., the most recent weight table 310) in the storage device 215 (the nonvolatile storage device 230, for example). Subsequently, the processor 210 ends the process of FIG. 4. If determination error has not been resolved after performing the adjustment process the upper limit number of times, the processor 210 may store the adjusted condition data 300 including the most recent weight table 310 in the storage device 215, and may subsequently end the process of FIG. 4.

Figure 11:
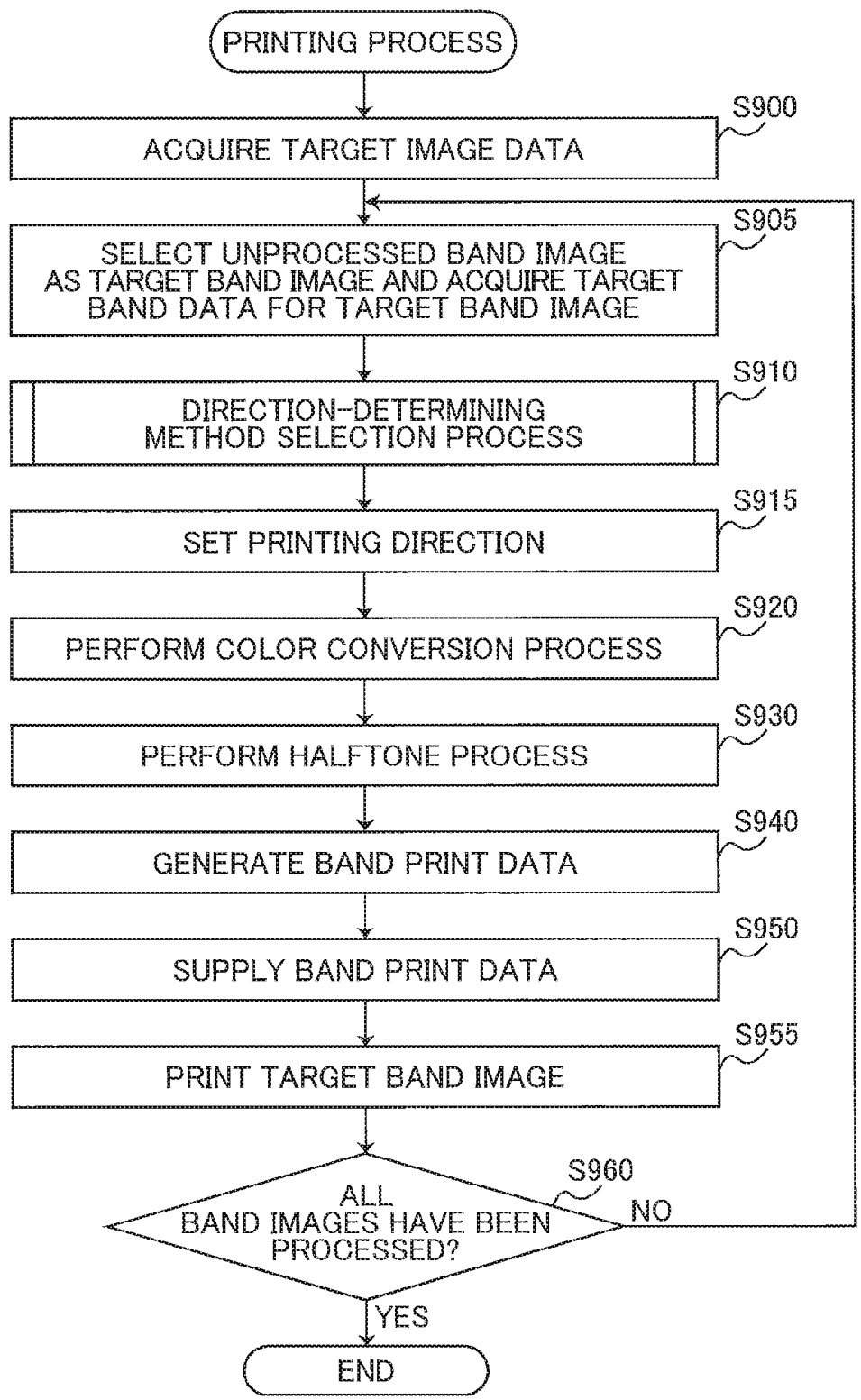
FIG. 11 is a flowchart illustrating steps in an example of a printing process executed by the processor of the multifunction peripheral according to the first embodiment of the present disclosure.

The adjusted condition data 300 is used in a printing process. FIG. 11 is a flowchart illustrating an example of the printing process. In the present embodiment, the processor 210 of the multifunction peripheral 200 begins the process of FIG. 11 when the user inputs a print start command on the operating unit 250. The processor 210 executes the process in FIG. 11 according to the program 234.

In S900 the processor 210 acquires image data specified in the print start command. Hereinafter, this acquired image data will be called the target image data. Target image data to be printed is acquired from are movable storage device (not illustrated; a USB flash drive, for example) connected to the multifunction peripheral 200. As with the image data acquired in S110 of FIG. 4, this target image data will be assumed to be RGB bitmap data in the present embodiment. When the pixel density of the target image data differs from the pixel density prescribed for the printing process, the processor 210 executes a process to convert the pixel density of the target image data to the prescribed pixel density for the printing process.

In S905 the processor 210 selects one unprocessed band image from among the plurality of band images in the target image represented by the target image data. In the present embodiment, the target image is divided into a plurality of band images that are juxtaposed in the sub-scanning direction D3. The method of dividing the target image is identical to the method described in S135 of FIG. 4. In S905 the processor 210 selects the band image positioned farthest downstream in the sub-scanning direction D3 among one or more unprocessed band images (i.e., the band image to be printed earliest) and acquires band data representing the selected band image. In the following description, the band image selected in S905 will be called the "target band image," and the portion of the target image data representing the target band image will be called the "target band data."

In S910 the processor 210 executes the direction-determining method selection process for the target band data. The direction-determining method selection process of S910 is performed according to the steps in FIG. 6 using the adjusted condition data 300. In S915 the processor 210 sets the printing direction for printing the target band image according to the direction-determining method selected in S910. Note that, if the target band image is the first band image in the printing order and the direction-determining method is the bidirectional method, the processor 210 may set the printing direction to a predetermined direction, such as the forward direction D1. In S920 the processor 210 converts the pixel values for each pixel in the target band data from RGB gradation values to CMYK gradation values corresponding to the ink color components. Correlations between RGB and CMYK color components are defined by a lookup table (not illustrated) pre-stored in the nonvolatile storage device 230. The processor 210 performs color conversion while referencing this lookup table.

In S930 the processor 210 performs a halftone process using the target band data produced from the color conversion process. The halftone process is performed according to the error diffusion method, but a method using dither matrices may be used instead for the halftone process.

In S940 the processor 210 generates band print data using the results of the halftone process for printing the target band image. The band print data is data having a format that the control circuit 298 of the print execution unit 290 in the multifunction peripheral 200 can interpret. Band print data includes information representing the printing direction (the forward direction D1 or reverse direction D2), information representing the results of the halftone process (an ink dot pattern), and information representing the feed amount to be used for conveying the sheet PM following the partial print.

In S950 the processor 210 supplies the band print data generated in S940 to the print execution unit 290. In S955 the control circuit 298 of the print execution unit 290 executes a partial print and a conveying process by controlling the head 292, reciprocating device 294, and conveying device 296 according to the band print data. Through this process, the print execution unit 290 prints a target band image.

In S960 the processor 210 determines whether all band images have been processed. If there remain unprocessed band images (S960: NO), the processor 210 returns to S905 and repeats the above process on the next unprocessed band image. When all band images have been processed (S960: YES), the processor 210 ends the printing process.

In S910 and S915, the printing direction for printing the target band image is set according to the adjusted condition data 300. Accordingly, this process can improve printing speed while suppressing color variation.

As described above, the print execution unit 290 in FIG. 1 is provided with the head 292, reciprocating device 294, and conveying device 296. The head 292 has nozzle groups NgK, NgY, NgM and NgC juxtaposed along the main scanning directions D1 and D2 for ejecting ink of different colors. The reciprocating device 294 executes main scans for moving the head 292 relative to the sheet PM (see FIG. 2A) along the main scanning directions (the forward direction D1 or the reverse direction D2). The conveying device 296 executes sub scans for moving the sheet PM relative to the head 292 along the sub-scanning direction D3 that crosses the main scanning directions D1 and D2.

As described in FIGS. 2A through 2C and FIG. 11, the print execution unit 290 executes a partial print and a sub scan a plurality of times in a printing process. A partial print is a process for ejecting ink of a plurality of types toward the sheet PM from the plurality of nozzle groups NgK, NgY, NgM, and NgC while performing a main scan in the printing direction. As described in S910 and S915 of FIG. 11 and in FIG. 6, the condition data 300 is used for determining the printing direction for each of a plurality of partial prints. The control unit 299 in the multifunction peripheral 200 adjusts the condition data 300 by executing the adjustment process of FIG. 4. The control unit 299 is an example of the information processing apparatus for adjusting the condition data 300.

More specifically, the processor 210 acquires target image data in S130 of FIG. 4 and repeatedly executes the process in S160 (and specifically in S350 through S380 of FIG. 6) for each partial image in the target image. In the process of S160, the processor 210 determines whether a specific condition is met for the partial image. Here, the specific condition is met when the block evaluation value BV for any block BL in the partial image is greater than or equal to the block evaluation value threshold BVt. The block evaluation value BV is an example of the image evaluation value of the present disclosure. The image evaluation value is a value used to evaluate the difference between (1) the color of a partial image printed using a partial print in the forward direction D1 and (2) the color of the same partial image printed using a partial print in the reverse direction D2.

In S350 through S380 of FIG. 6, the processor 210 selects a direction-determining method for determining the printing direction in accordance with a determination result of whether the specific condition is met. The direction-determining method is selected from between the unidirectional method and the bidirectional method. The unidirectional method sets the printing direction to the forward direction D1 irrespective of the printing direction used for the preceding partial print in the printing order. The bidirectional method sets the printing direction to the direction opposite to the printing direction used for the preceding partial print in the printing order. By repeatedly executing the process in S350 through S380 of FIG. 6, the processor 210 selects a direction-determining method for each of the partial images in the target image.

Thereafter, the processor 210 determines whether the direction-determining method selected for each of the partial images matches the correct method predetermined for each of the partial images by repeating steps S165 and S170 in FIG. 4. When the selected direction-determining method differs from the correct method (S170: NO), the processor 210 adjusts the condition data 300 in S190 through S220 to improve the accuracy of selecting the correct method (i.e., to eliminate determination errors).

Specifically, if the selected direction-determining method is the bidirectional method while the correct method is the unidirectional method, in S210 the processor 210 executes the first adjustment process. In the first adjustment process (FIGS. 7 and 8), the processor 210 adjusts the condition data 300 to increase selectability of the unidirectional method. This process facilitates the selection of the unidirectional method.

Further, if the selected direction-determining method is the unidirectional method while the correct method is the bidirectional method, in S220 the processor 210 executes the second adjustment process. In the second adjustment process (FIGS. 9 and 10), the processor 210 adjusts the condition data 300 to increase selectability of the bidirectional method. This process results in facilitating selection of the bidirectional method.

Hence, when the selected direction-determining method differs from the correct method, the processor 210 adjusts the condition data 300 to increase the likelihood of selecting the correct method. Accordingly, the processor 210 can adjust the condition data 300 to conform with the correct method.

As illustrated in FIG. 1, the condition data 300 includes the weight table 310. The weight table 310 (see FIG. 3A) is an example of the correlation data specifying correlations between RGB color values 311 in the RGB color space and weights W. The weight table 310 specifies a plurality of correlations for a plurality of differing color values. The RGB color space is an example of the color space for the target image data in the adjustment process (see FIG. 4). The weight W denotes an evaluation value for the difference between the color of an image that is printed according to the color values using a partial print in the forward direction D, and the color of an image that is printed according to the same color values using a partial print in the reverse direction D2.

As described in FIG. 5 and the like, a partial image (a band image) is configured of a plurality of blocks. In S340 of FIG. 6, the processor 210 calculates the block evaluation value BV (an example of the image evaluation value of the present disclosure) for a plurality of pixels in the partial image (the plurality of pixels in a single block in the present embodiment). The block evaluation value BV is calculated using the weights W in the weight table 310 that are correlated with a plurality of color values.

The first adjustment process in FIG. 7 includes the steps S520 and S550. In S520 the processor 210 identifies a first target block from the plurality of blocks in the partial image. The first target block is the block having the largest block evaluation value. As described in S340 of FIG. 6, the block evaluation value BV is an evaluation value of the directional color difference (see FIG. 2C) for an image of the block. In S550 the processor 210 increases the weights W for grid points referenced to calculate the weights of the pixels in the first target block. In the present embodiment, the plurality of pixels that contribute to the increase in the weight W is the plurality of pixels correlated with weights that exceed the first threshold Wt1 and may be just some of the pixels included in the first target block. In this way, the processor 210 adjusts the weights W in the weight table 310 correlated with the color values for a plurality of pixels in the first target block to larger weights W than their pre-adjusted weights W.

Thus, in the first adjustment process the processor 210 adjusts weights W in the weight table 310 using the first target block having the largest block evaluation value BV, thereby appropriately increasing the selectability of the unidirectional method. Specifically, since the first target block has the largest block evaluation value BV, the block evaluation value BV for the first target block can easily satisfy the condition in S350 (see FIG. 6).

The second adjustment process in FIG. 9 includes steps S620, S630, and S650. In S620 and S630, the processor 210 identifies second target blocks whose block evaluation values BV are greater than or equal to the block evaluation value threshold BVt from the plurality of blocks in the partial image. In S650 the processor 210 decreases the weights W for grid points referenced to calculate the weights of pixels in the second target block that was discovered first. More specifically, the processor 210 decreases a plurality of weights W corresponding to respective ones of a plurality of sets of RGB color values for the pixels in the second target block in the weight table 310. In the present embodiment, the plurality of pixels that contribute to reducing the weights W are those pixels correlated with weights that exceed the second threshold Wt2 and may be just some of the pixels in the second target block. In this way, the processor 210 adjusts the weights W in the weight table 310 correlated with the color values for a plurality of pixels in the initially identified second target block to smaller weights W than their pre-adjusted weights W.

Thus, the processor 210 adjusts weights W in the weight table 310 in the second adjustment process using the second target block that was identified first from the plurality of blocks, thereby minimizing the time required for adjusting weights W in the weight table 310. For example, a plurality of blocks in a single partial image may represent a common object. By adjusting weights W using the second target block that was first identified in this case, the processor 210 can reduce the block evaluation value BV not only for the initially discovered second target block, but also for other blocks representing the same object. Thus, this method can minimize the time required for performing the second adjustment process (i.e., for eliminating determination errors) than if the block evaluation value BV for each block in the partial image were compared to the block evaluation value threshold BVt.

B. Second Embodiment

Figure 12:
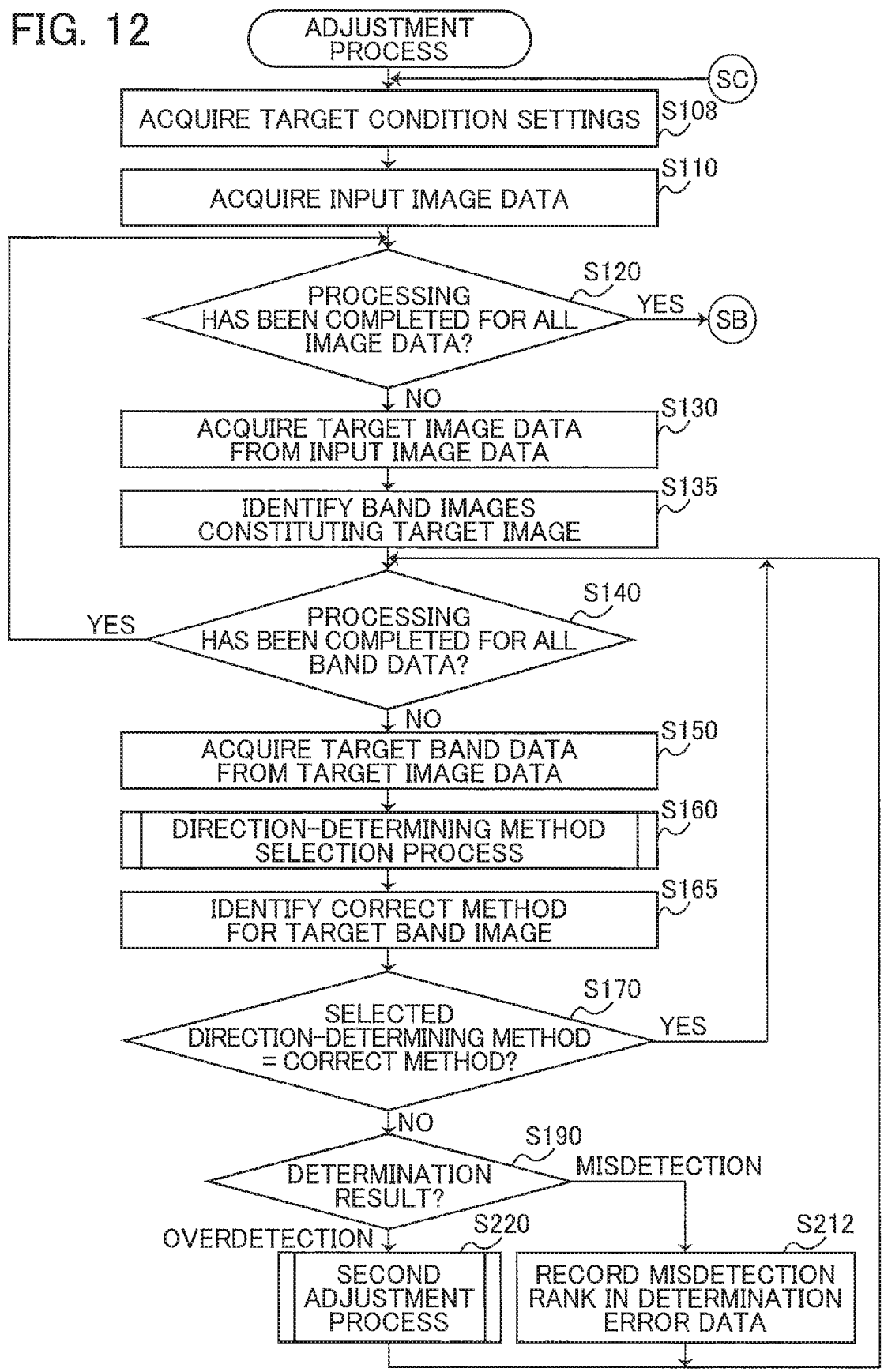
FIG. 12 is a flowchart illustrating part of steps in an example of an adjustment process executed by the processor of the multifunction peripheral according to a second embodiment of the present disclosure.
Figure 13:
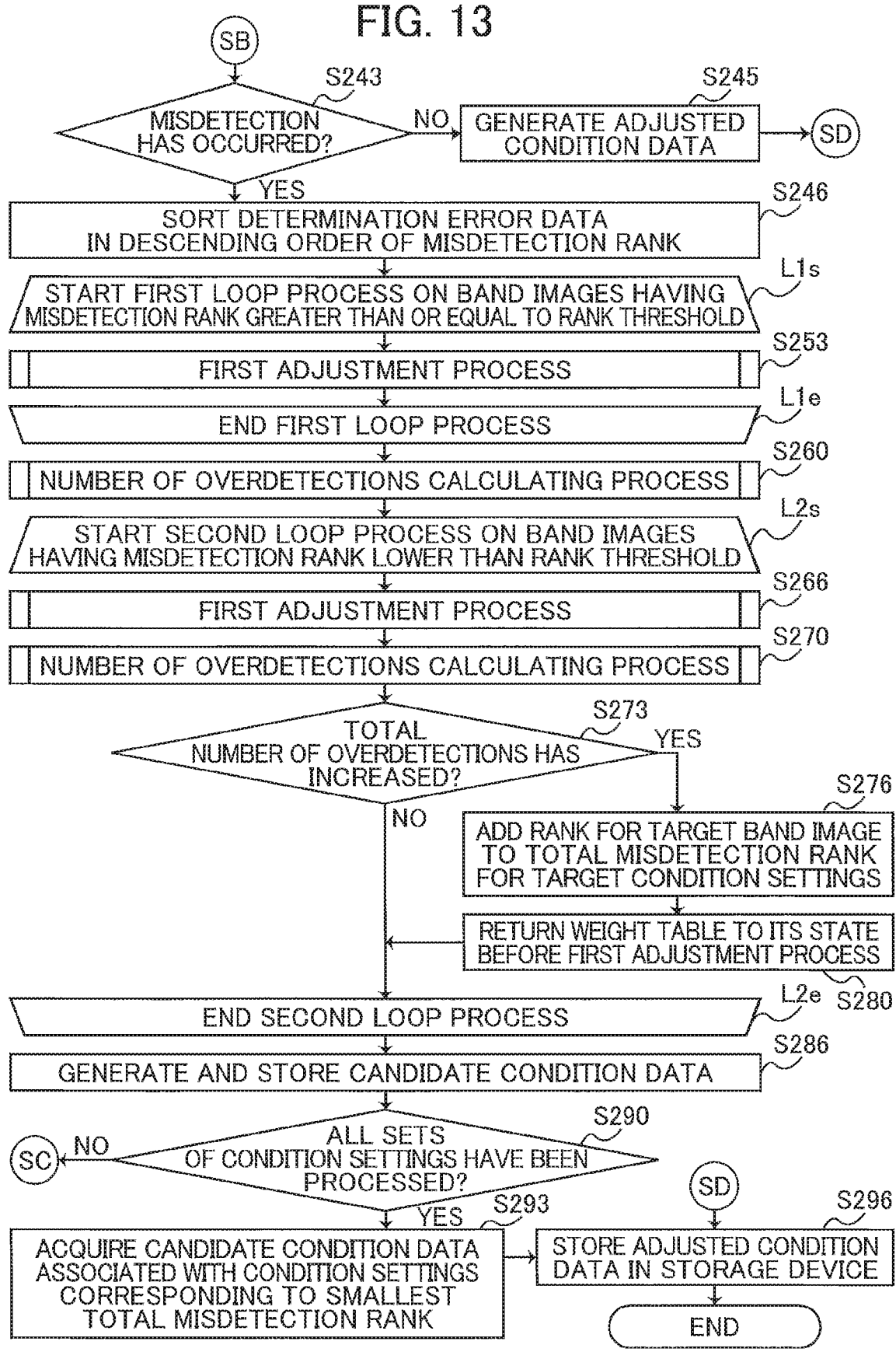
FIG. 13 is a flowchart illustrating remaining steps in the example of the adjustment process executed by the processor of the multifunction peripheral according to the second embodiment of the present disclosure.

FIGS. 12 and 13 are flowcharts illustrating the adjustment process according to a second embodiment. FIG. 13 is a continuation of the process in FIG. 12. Unlike the adjustment process in FIG. 4, the elimination of overdetection determination errors is prioritized while misdetection determination errors are allowed. A set of condition settings for selecting the method of determining the printing direction (the direction-determining method) is selected from a plurality of sets of prepared condition settings. Steps in the process of FIGS. 12 and 13 identical to those in FIG. 4 are designated with the same step numbers to avoid duplicating description.

In S108 at the beginning of the process in FIG. 12, the processor 210 references the condition settings data 390 (see FIG. 1) to acquire unprocessed condition settings. FIG. 14A is an explanatory diagram illustrating an example of the condition settings data 390. The condition settings data 390 is a table specifying correlations between second thresholds Wt2, block widths BW, block heights BH, and total misdetection ranks Rx. A plurality of combinations of the second thresholds Wt2, block widths BW, and block heights BH is preset in the condition settings data 390. Each combination indicates a different set of condition settings for selecting the direction-determining method. Overdetection determination errors are better suppressed when using a smaller second threshold Wt2 (see FIGS. 10C and 10D) because weights W for more grid points will be reduced in the second adjustment process. Further, the number of pixels used for calculating the block evaluation value BV (S340 of FIG. 6) is greater when the block height BH is larger. Thus, a larger height BH can better suppress overdetection determination errors caused by a few pixels with a large weight W increasing the block evaluation value BV. Similarly, overdetection determination errors are better suppressed when the block width BW is larger by preventing an increase in the block evaluation value BV due to a few pixels. While not illustrated in the table, the total misdetection rank Rx is initialized to zero when the adjustment process in FIGS. 12 and 13 is begun. Thereafter, the total misdetection rank Rx is updated through the process described later.

In S108 the processor 210 acquires one unprocessed set of condition settings from the plurality of sets specified in the condition settings data 390. Hereinafter, the selected set of condition settings will be called the "target condition settings." The processor 210 attempts to select a direction-determining method and to adjust the weights W according to the target condition settings acquired in S108.

After completing the process in S108, the processor 210 advances to S110. The process in FIG. 12 beginning from S110 is roughly the same as the process in FIG. 4 but differs from the process in FIG. 4 on six points. The first difference is that the process for selecting the direction-determining method in S160 (and specifically in S310 and S340 of FIG. 6) is performed using the target condition settings (the block height BH and block width BW). The second difference is that the process in S180 of FIG. 4 to update the determination error data 380 has been eliminated. The third difference is that the second adjustment process of S220 (and specifically step S650 of FIG. 9) is performed using the target condition settings (the second threshold Wt2). The fourth difference is that a rank recording process (S212) is performed in place of the first adjustment process (S210 of FIG. 4) when a misdetection determination error occurs. The fifth difference is that the processor 210 returns to S140 rather than S110 after completing step S212 or S220. The sixth difference is that the processor 210 advances to S243 of FIG. 13 rather than perform the process to store the adjusted condition data 300 (S296) when an affirmative determination is made in S120 (S120: YES). The remaining steps in FIG. 12 are identical to the corresponding section of FIG. 4, and as already described, these steps are designated with the same step numbers to avoid duplicating description.

As in the process of FIG. 4, when an overdetection determination error occurs in the process of FIG. 12, the weight table 310 is adjusted in S220 to eliminate this determination error. When a misdetection determination error occurs in the process of FIG. 12, in S212 the processor 210 records a rank for the determination error in determination error data 380a. Ranks are determined according to correct method data. FIG. 14B is an explanatory diagram illustrating an example of correct method data 370a used in the present embodiment. The correct method data 370a differs from the correct method data 370 in FIG. 3B in the addition of a rank Rk. If band images that should be printed in a printing direction based on the unidirectional method are instead incorrectly printed in directions based on the bidirectional method, color variation will occur. The rank Rk denotes how noticeable this color variation will be. The larger the rank Rk, the more noticeable the color variation. The rank Rk is predetermined experimentally and is set only for pass numbers whose correct method is the unidirectional method. In the example of FIG. 14B, the rank Rk is 0.5 for the second band image in the first image. The rank Rk is not set for pass numbers whose correct method is the bidirectional method.

FIG. 14C is an explanatory diagram illustrating the determination error data 380a used in the second embodiment. The determination error data 380a provides correlations between image numbers, pass numbers, and misdetection ranks Rm. The determination error data 380a shows ranks for band images that have induced misdetection determination errors. In S212 the processor 210 references the correct method data 370a in FIG. 14B to identify the rank Rk correlated with the band image that has induced a misdetection determination error. Next, the processor 210 sets the misdetection rank Rm in the determination error data 380a for the band image that has induced the misdetection determination error to the identified rank Rk. In the example of FIG. 14C, the second band image in the first full-page image has induced a misdetection determination error, and the misdetection rank Rm for that band image is 0.5. When a plurality of band images produce misdetection determination errors, the misdetection ranks Rm for these band images are set to the values of their corresponding ranks Rk.

In the present embodiment, the processor 210 returns to S140 after completing steps S212 or S220 in FIG. 12. Thus, all bands in the target image undergo the process in S150 through S220. Once all band data has been processed (S140: YES) and all bands have been processed in all images (S120: YES), the processor 210 advances to S243 in FIG. 13.

In S243 the processor 210 references the determination error data 380a (see FIG. 14C) to determine whether a misdetection determination error has occurred. If the column for misdetection rank Rm is blank, no misdetection determination error has occurred (S243: NO). In this case, in S245 the processor210 generates adjusted condition data 300 using the latest weight table 310 (e.g., the weight table 310 adjusted in S220) and the target condition settings. The threshold data 320 and block size data 330 are determined using the target condition settings. Subsequently, in S296 the processor 210 stores the adjusted condition data 300 in the nonvolatile storage device 230 and ends the process in FIGS. 12 and 13. Step S296 in FIG. 13 is identical to the process in S296 of FIG. 4.

However, if the processor 210 detects misdetection determination errors in the determination error data 380a (S243: YES), in S246 the processor 210 sorts the plurality of band images in the determination error data 380a (i.e., the plurality of combinations of image numbers and pass numbers)

so that the misdetection ranks Rm are in descending order. Next, the processor 210 executes a first loop process on all band images having a misdetection rank Rm greater than or equal to a rank threshold. The first loop process is the process in S253 sandwiched between the loop start L1s and the loop end L1e. In the first loop process, the processor 210 executes the first adjustment process in S253. The rank threshold is a value predetermined experimentally and specifies the lower limit of ranks Rk that are not allowable. By performing this loop process, the processor 210 adjusts weights W in the weight table 310 in order to eliminate determination errors in band images associated with a misdetection rank Rm greater than or equal to the rank threshold.

In S260 the processor 210 executes a process to calculate the number of overdetections. Hereinafter, this process will be called the "number of overdetections calculating process." FIG. 15 is a flowchart illustrating an example of the number of overdetections calculating process. In the number of overdetections calculating process illustrated in FIG. 15, the processor 210 executes a third loop process on each full-page image in the input image data 360. The third loop process is the process in S720 and S730 sandwiched between the loop start L3s and the loop end L3e. In S720 the processor 210 selects one full-page image from the input image data 360 to be the target image and selects the method of determining the printing direction for each partial image in the target image. The processor 210 selects the printing direction determining method for each band image according to the process in FIG. 6. In the second embodiment, the processor 210 performs the process in FIG. 6 using the target condition settings acquired in S108 of FIG. 12 and the weight table 310 adjusted in S253 of FIG. 13. In S730 the processor 210 identifies the correct method for each band image by referencing the correct method data 370a (see FIG. 14B), calculates the number of overdetection determination errors in the target image, and stores this number in the storage device 215 (the nonvolatile storage device 230, for example). The processor 210 repeatedly performs the process in S730 until all images have been processed in order to find the number of overdetection determination errors for each full-page image. Hence, by performing the third loop process on all full-page images, the processor 210 calculates a first total denoting the total number of overdetection determination errors in all full-page images when using the weight table 310 adjusted in S253 (FIG. 13).

Next, the processor 210 executes a second loop process on each band image whose misdetection rank Rm is set lower than the rank threshold. The second loop process is the process in S260 through S280 sandwiched between the loop start L2s and the loop end L2e in FIG. 13. In S266 at the beginning of this process, the processor 210 selects one band image to be the target band image and executes the first adjustment process on the target band image. Thus, the weight table 310 maybe adjusted in the first adjustment process of S253 and further adjusted in the first adjustment process of S266.

In S270 the processor 210 executes the number of overdetections calculating process. The process in S270 is performed according to the steps in FIG. 15 using the target condition settings acquired in S108 of FIG. 12 and the weight table 310 adjusted in S253 and S266. Thus, the processor 210 calculates a second total denoting the total number of overdetection determination errors occurring when using the weight table 310 that was adjusted in S253 and S266.

In S273 the processor 210 determines whether the total number of overdetection determination errors has increased in the adjustment in S266. In other words, the processor 210 reaches an affirmative determination in S273 (S273: YES) when the second total calculated in S270 is greater than the first total calculated in S260. In this case (S273: YES), the processor 210 cancels the removal of misdetection determination errors resulting from the first adjustment process in S266. Specifically, in S276 the processor 210 adds the rank Rk for the target band image to the total misdetection rank Rx for the target condition settings in the condition settings data 390 (see FIG. 14A). In S280 the processor 210 returns the weight table 310 to its state before adjustments were made in S266. Next, the processor 210 performs the second loop process on the next band image. If a negative determination is made in S273 (S273: NO), the processor 210 performs the second loop process on the next band image without executing the process in S276 and S280.

After completing the second loop process, the total misdetection rank Rx for the target condition settings in the condition settings data 390 denotes the total value of ranks Rk associated with misdetection determination errors resulting when the target condition settings are applied. The smaller the total misdetection rank Rx, the less noticeable the color variation. Therefore, applying condition settings corresponding to the smallest total misdetection rank Rx is preferred.

In S286 the processor 210 generates candidate condition data and stores this candidate condition data in the nonvolatile storage device 230. The candidate condition data is condition data adjusted using the target condition settings and the adjusted weight table 310. In S290 the processor 210 determines whether all sets of condition settings have been processed. If there remain unprocessed sets of condition settings (S290: NO), the processor 210 returns to S108 in FIG. 12 and repeats the above process on an unprocessed set of condition settings. When processing new condition settings, the processor 210 begins the process using the unadjusted weight table 310 (i.e., the weight table 310 having its initial values).

Once all sets of condition settings have been processed (S290: YES), total misdetection ranks Rx for all condition settings have been recorded in the condition settings data 390 illustrated in FIG. 14A. In S293 the processor 210 identifies the set of condition settings corresponding to the smallest total misdetection rank Rx and acquires the candidate condition data associated with the identified condition settings from the nonvolatile storage device 230. In S296 the processor 210 stores the candidate condition data acquired in S293 in the storage device 215 (the nonvolatile storage device 230, for example) as the adjusted condition data 300. Subsequently, the processor 210 ends the process in FIGS. 12 and 13.

In the second embodiment described above, the weight table 310 is adjusted to eliminate overdetection determination errors (i.e., the incorrect selection of the unidirectional method). Subsequently, the weight table 310 is adjusted to eliminate misdetection determination errors having a rank for color variation that exceeds a threshold value. The weight table 310 is adjusted for each of a plurality of sets of condition settings. Next, adjusted condition data 300 is generated using the set of condition settings having the smallest overall color variation (the total misdetection rank Rx in this case), and the adjusted weight table 310 associated with these condition settings. Accordingly, this process can appropriately improve printing speed while suppressing major color variation. Occasionally, resolving overdetection determination errors and resolving misdetection determination errors are not compatible. By prioritizing the resolution of overdetection determination errors, the process of the present embodiment can suitably adjust the condition data 300.

C. Third Embodiment

Figure 16A:
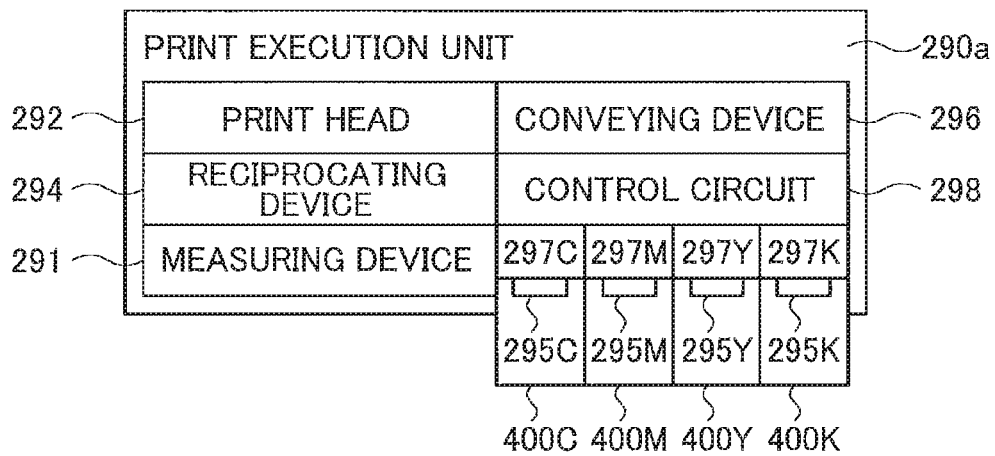
FIG. 16A is an explanatory diagram illustrating a print execution unit of a multifunction peripheral according to a third embodiment of the present disclosure.

FIG. 16A is an explanatory diagram illustrating a print execution unit 290a according to a third embodiment. The print execution unit 290a differs from the print execution unit 290 in FIG. 1 only with the provision of a measuring device 291. The structures of the remaining parts in the print execution unit 290a are identical to the structures in the corresponding parts of the print execution unit 290, and like parts and components are designated with the same reference numerals to avoid duplicating description.

The measuring device 291 measures parameters related to the print execution unit 290a. The measuring device 291 may be a temperature sensor or a humidity sensor. The measuring device 291 may also be a timer for measuring time that has elapsed since each of the cartridges 400C, 400M, 400Y, and 400K was last replaced. For example, the processor 210 detects when each of the cartridges 400C, 400M, 400Y, and 400K was replaced by monitoring the status of the switches 295C, 295M, 295Y, and 295K. When a cartridge is replaced, the processor 210 begins measuring elapsed time using the measuring device 291 (the timer) beginning from the point that the new cartridge was mounted.

Figure 16B:
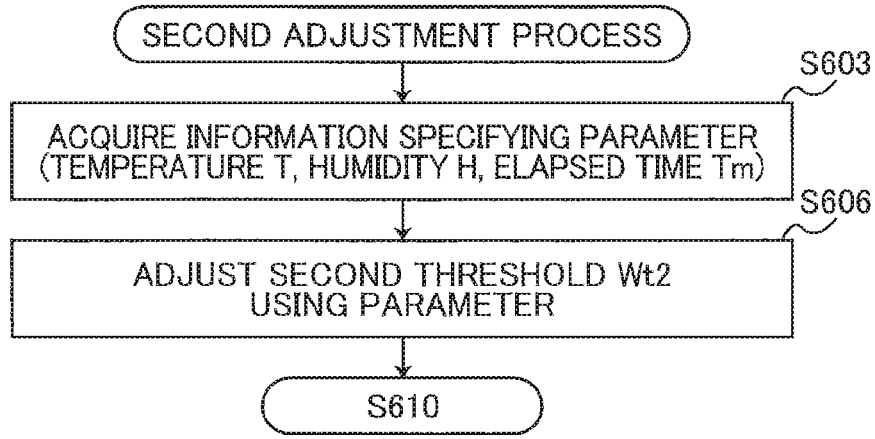
FIG. 16B shows a portion of a flowchart illustrating steps in the second adjustment process executed by the processor of the multifunction peripheral according to the third embodiment of the present disclosure.

FIG. 16B shows a portion of a flowchart illustrating steps in the second adjustment process according to the third embodiment. The second adjustment process according to the third embodiment differs from the process in FIG. 9 only in the addition of steps S603 and S606 at the beginning thereof. All steps other than S603 and S606 are identical to those in the process of FIG. 9.

In S603 the processor 210 acquires information from the measuring device 291 specifying a parameter. In S606 the processor 210 adjusts the second threshold Wt2 (see FIG. 10D) using the parameter specified using the information acquired from the measuring device 291. After completing the process in S606, the processor 210 advances to S610 (see FIG. 9). The process beginning from S610 is identical to the process of FIG. 9 according to the first embodiment. In S650 the processor 210 uses the adjusted second threshold Wt2.

Figure 16C:
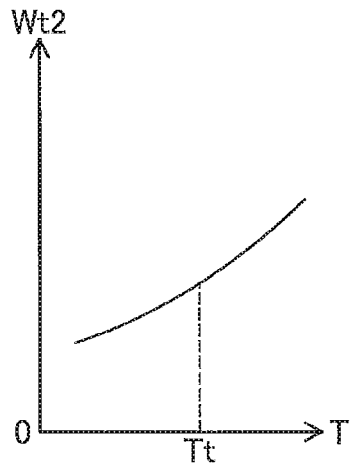
FIG. 16C illustrates a graph showing a second threshold when a parameter is a temperature, where a horizontal axis represents the temperature acquired as the parameter, and a vertical axis represents the second threshold used for the second adjustment process according to the third embodiment.

FIG. 16C is a graph showing the second threshold Wt2 when the parameter is a temperature T. In the graph of FIG. 16C, the horizontal axis represents the temperature T, and the vertical axis represents the second threshold Wt2. As illustrated in the graph, the second threshold Wt2 is adjusted to larger values as the temperature T increases. Thus, the second threshold Wt2 is greater when the temperature T is higher than a temperature threshold Tt than when the temperature T is less than or equal to the temperature threshold Tt, for example. The reasoning for this is as follows.

Since water content in the ink has a greater tendency to evaporate near the nozzles Nz when the temperature T in the print execution unit 290a is high, ink ejected from the nozzles Nz is more likely to be dark. Since the directional color difference is more noticeable when the ink is dark, selectability of the bidirectional method should be decreased when the temperature T is high than when the temperature T is low. Selectability of the bidirectional method is increased when the second adjustment process is performed to eliminate overdetection determination error. However, even when performing the second adjustment process, it is preferable to suppress unintentional selection of the bidirectional method and to facilitate selection of the unidirectional method when the temperature T is high. In other words, selection of the bidirectional method is preferably made more difficult after performing the second adjustment process when the temperature T is high. Difficulty in selecting the bidirectional method denotes that selectability of the bidirectional method is low. As illustrated in FIGS. 10C and 10D, unadjusted weights Wi within the adjustment range greater than the second threshold Wt2 and less than or equal to the maximum value Wm are adjusted to a smaller value in the second adjustment process. Since the adjustment range for unadjusted weights Wi is smaller when the second threshold Wt2 is larger, the amount of decrease in the block evaluation value BV (S340, etc. in FIG. 6) is smaller. Consequently, selectability of the bidirectional method is less likely increased when the second threshold Wt2 is large (i.e., the degree of increase in selectability of the bidirectional method is low). Thus, unintended selection of the bidirectional method is suppressed when the second threshold Wt2 is large, facilitating selection of the unidirectional method. Thus, the second threshold Wt2 is preferably increased for larger temperatures T.

The degree of increase in selectability of the bidirectional method is denoted by an increment in the number of times that the bidirectional method is selected based on the plurality of band images in the same input image data 360. That is, the increment is obtained by subtracting the number of times that the bidirectional method is selected according to the pre-adjusted weight table 310 from the number of times that the bidirectional method is selected according to the adjusted weight table 310. The larger this increment, the greater the degree of increase in selectability of the bidirectional method. Further, the more times the bidirectional method is selected, the higher the selectability of the bidirectional method; and the fewer times the bidirectional method is selected, the lower the selectability of the bidirectional method. This explanation is similar for the unidirectional method.

In the present embodiment, the second threshold Wt2 is larger when the temperature T is higher than the temperature threshold Tt (i.e., when color variation is more noticeable) than when the temperature T is less than or equal to the temperature threshold Tt (i.e., when color variation is less noticeable). In this way, the degree of increase in selectability of the bidirectional method is lower when the temperature T is higher than the temperature threshold Tt than when the temperature T is lower than or equal to the temperature threshold Tt. Accordingly, since selectability of the bidirectional method is low when the temperature T is high, unintended selection of the bidirectional method can be suppressed even when the second adjustment process is performed, thereby preventing noticeable color variation.

Figure 16D:
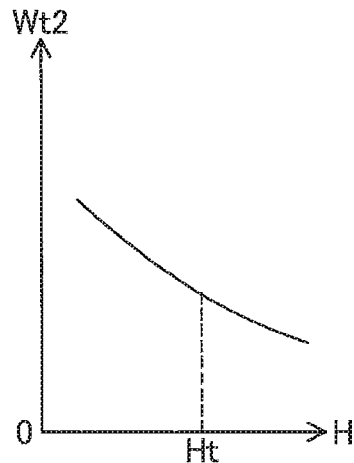
FIG. 16D illustrates a graph showing the second threshold when the parameter is humidity, where a horizontal axis represents the humidity acquired as the parameter, and a vertical axis represents the second threshold used for the second adjustment process according to the third embodiment.

FIG. 16D is a graph showing the second threshold Wt2 when the parameter is humidity H. In the graph, the horizontal axis represents the humidity H, and the vertical axis represents the second threshold Wt2. As illustrated in the graph, the second threshold Wt2 is adjusted to a larger value for lower humidity H. For example, the second threshold Wt2 is larger when the humidity H is lower than a humidity threshold Ht than when the humidity H is greater than or equal to the humidity threshold Ht. The reasoning for this is as follows. When the humidity H is low in the print execution unit 290, water content in the ink tends to evaporate near the nozzles Nz more so than when the humidity H is high and, hence, ink ejected from the nozzles Nz tends to be darker. Accordingly, color variation is more noticeable when the humidity H is low. As in the example of FIG. 16C, in the example of FIG. 16D, the second threshold Wt2 is larger when color variation is more noticeable (i.e., when the humidity H is lower than the humidity threshold Ht) than when color variation is less noticeable (i.e., when the humidity H is greater than or equal to the humidity threshold Ht). Hence, the degree of increase in selectability of the bidirectional method is lower when the humidity H is lower than the humidity threshold Ht than when the humidity H is higher than or equal to the humidity threshold Ht. Therefore, since selectability of the bidirectional method is lower when the humidity H is low, unintended selection of the bidirection method can be suppressed even when the second adjustment process is performed, thereby suppressing noticeable color variation.

Figure 16E:
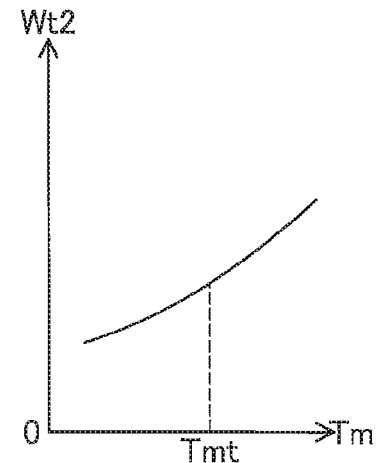
FIG. 16E illustrates a graph showing the second threshold when the parameter is elapsed time after a cartridge was last replaced, where a horizontal axis represents the elapsed time acquired as the parameter, and a vertical axis represents the second threshold used for the second adjustment process according to the third embodiment.

FIG. 16E is a graph showing the second threshold Wt2 when the parameter is elapsed time Tm. In the graph, the horizontal axis represents the elapsed time Tm after the cartridge was last replaced, and the vertical axis represents the second threshold Wt2. As illustrated in the graph, the second threshold Wt2 is adjusted to a larger value as the elapsed time Tm increases. For example, the second threshold Wt2 is larger when the elapsed time Tm is longer than a time threshold Tint than when the elapsed time Tm is less than or equal to the time threshold Tmt. The reasoning for this is as follows. When the elapsed time Tm is long, ink ejected from the nozzles Nz becomes darker due to various reasons (the settling of colorant in the ink and the evaporation of water in the ink, for example) than when the elapsed time Tm is short. Consequently, color variation is more noticeable when the elapsed time Tm is long. As in the example of FIG. 16C, in the example of FIG. 16E, the second threshold Wt2 is larger when color variation is more noticeable (i.e., when the elapsed time Tm is longer than the time threshold Tmt) than when color variation is less noticeable (i.e., when the elapsed time Tm is less than or equal to the time threshold Tmt). As a result, the degree of increase in selectability of the bidirectional method is lower when the elapsed time Tm is longer than the time threshold Tmt than when the elapsed time Tm is less than or equal to the time threshold Tmt. Therefore, since selectability of the bidirectional method is lower when the elapsed time Tm is longer, unintended selection of the bidirectional method can be suppressed even when the second adjustment process is performed, thereby preventing noticeable color variation.

D. Fourth Embodiment

FIG. 17A is an explanatory diagram illustrating condition data 300x according to a fourth embodiment. In the fourth embodiment, one of two printing modes is selected for the printing process: a first printing mode; and a second printing mode. The condition data 300x includes first condition data 300a for the first printing mode, and second condition data 300b for the second printing mode. As with the condition data 300 in FIG. 1, the condition data 300a and 300b respectively include weight tables 310a and 310b, threshold data 320a and 320b, and block size data 330a and 330b. In their initial states, the first condition data 300a is equivalent to the second condition data 300b, that is, the data 310a, 320a, and 330a are equivalent to the corresponding data 310b, 320b, and 330b. In the present embodiment, the weight tables 310a and 310b are adjusted independently.

FIG. 17B is an explanatory diagram illustrating sample combinations for the first printing mode and second printing mode. Four combinations C1 through C4 are illustrated in FIG. 17B. Any one of the combinations may be employed in the present embodiment.

In the first combination C1, the first printing mode is a "first standard mode," and the second printing mode is an "economy mode." The economy mode has less ink usage than the first standard mode. For example, the CMYK values in the economy mode are set by multiplying the CMYK values in the first standard mode corresponding to the same RGB values by a coefficient that is less than 1 (0.9, for example). When performing the color conversion process in S920 of FIG. 11, the processor 210 references correlations between RGB and CMYK values for the corresponding printing mode.

In the second combination C2, the first printing mode is an "enhanced contrast mode," and the second printing mode is a "second standard mode." The enhanced contrast mode has a higher contrast in printed images than the second standard mode. For example, in S900 of FIG. 11, the processor 210 may execute a contrast enhancement process corresponding to the printing mode. By performing the contrast enhancement process, areas with darker colors can be expanded. In other words, ink usage is higher in the enhanced contrast mode than in the second standard mode.

In the third combination C3, the first printing mode is a "simplex mode," and the second printing mode is a "duplex mode." The simplex mode is used for printing images on a single side of the sheet PM. The duplex mode is used for printing images on both sides of the sheet PM. Ink usage in the duplex mode is less than in the simplex mode in order to reduce the amount of ink that penetrates from a first surface of the sheet PM through to the second surface on the opposite side. As with ink usage in the economy mode described above, ink usage in the duplex mode is set based on ink usage in the simplex mode. In the color conversion process described in S920 of FIG. 11, the processor 210 references correlations between RGB and CMYK values for the corresponding printing mode.

In the fourth combination C4, the first printing mode is a "first paper type mode" for printing on a first type of paper, and the second printing mode is a "second paper type mode" for printing on a second type of paper. The second type of paper is paper on which ink dries slower than the first type of paper. For example, the first type of paper is matte paper, and the second type of paper is normal paper. Ink usage for the second paper type mode is less than for the first paper type mode in order to suppress wet ink on the second type of paper from unintentionally being transferred onto other objects (other paper, for example). As with ink usage in the economy mode described above, ink usage in the second paper type mode may be set using ink usage in the first paper type mode. In the color conversion process described in S920 of FIG. 11, the processor 210 references correlations between RGB and CMYK values associated with the corresponding printing mode.

In all four combinations C1 through C4 described above, ink usage in the first printing mode is greater than ink usage in the second printing mode when printing the same image. Consequently, color variation is more noticeable in the first printing mode. Therefore, the second adjustment process performed on the first condition data 300a for the first printing mode suppresses unintended selection of the bidirectional method more so than the second adjustment process performed on the second condition data 300b for the second printing mode.

FIG. 17C shows a portion of a flowchart illustrating steps in the adjustment process according to the fourth embodiment. Specifically, FIG. 17C shows steps S102 and S104 that are added to the beginning of the flowchart in FIG. 4. In S102 the processor 210 identifies the printing mode to be the subject of the adjustment process. This printing mode will be called the target mode. The target mode may be specified by the user. In S104 the processor 210 selects condition data from among the first condition data 300a and second condition data 300b that is associated with the target mode. After completing the process in S104, the processor 210 advances to S110 in FIG. 4. In the process from S110, the condition data selected in S104 is adjusted. All steps other than S102 and S104 are identical to those in FIG. 4. However, the second threshold Wt2 associated with the target mode is used in the second adjustment process of S220, as will be described below.

FIG. 17D is a graph showing correlations between the target mode and the second threshold Wt2, where the horizontal axis represents the target mode and the vertical axis represents the second threshold Wt2. As illustrated in this graph, a second threshold Wt2a for the first printing mode that is more susceptible to noticeable color variation is larger than a second threshold Wt2b for the second printing mode that is less susceptible to noticeable color variation. In the second adjustment process (see FIG. 9) performed on the second condition data 300b, weights W larger than the second threshold Wt2b are adjusted to smaller weights W than their pre-adjusted weights. In the second adjustment process performed on the first condition data 300a, weights W larger than the second threshold Wt2a are adjusted to smaller weights W than their pre-adjusted weights. Here, the second threshold Wt2a is larger than the second threshold Wt2b. As described in FIG. 16C and the like, since the degree of increase in selectability of the bidirectional method is lower for a higher second threshold Wt2, unintended selection of the bidirectional method is suppressed as the second threshold Wt2 is increased, thereby facilitating selection of the unidirectional method. In the second adjustment process, adjustments of the first condition data 300a are suppressed with a larger second threshold Wt2 than that used for the second condition data 300b. In other words, degree of increase in the selectability of the bidirectional method is lower when the second adjustment process adjusts the first condition data 300a when the second adjustment process adjusts the second condition data 300b. Through this process, unintended selection of the bidirectional method is suppressed in the first printing mode, thereby reducing noticeable color variation.

E. Fifth Embodiment

FIG. 18A is an explanatory diagram illustrating condition data 300y according to a fifth embodiment. In this embodiment, the type of blocks may be selected from among two types: a first block type; and a second block type. The condition data 300y includes first condition data 300c for the first block type, and second condition data 300d for the second block type. As in the condition data 300 of FIG. 1, the condition data 300c and 300d respectively include weight tables 310c and 310d, threshold data 320c and 320d, and block size data 330c and 330d. In their initial states, the first condition data 300c is identical to the second condition data 300d, that is, the data 310c, 320c, and 330c are identical to the corresponding data 310d, 320d, and 330d. In the present embodiment, the weight tables 310c and 310d are adjusted independently.

FIG. 18B is an explanatory diagram illustrating sample combinations for the first block type and second block type, and specifically the two combinations C11 and C12. Any one of the combinations may be employed in the present embodiment.

Figure 19A:
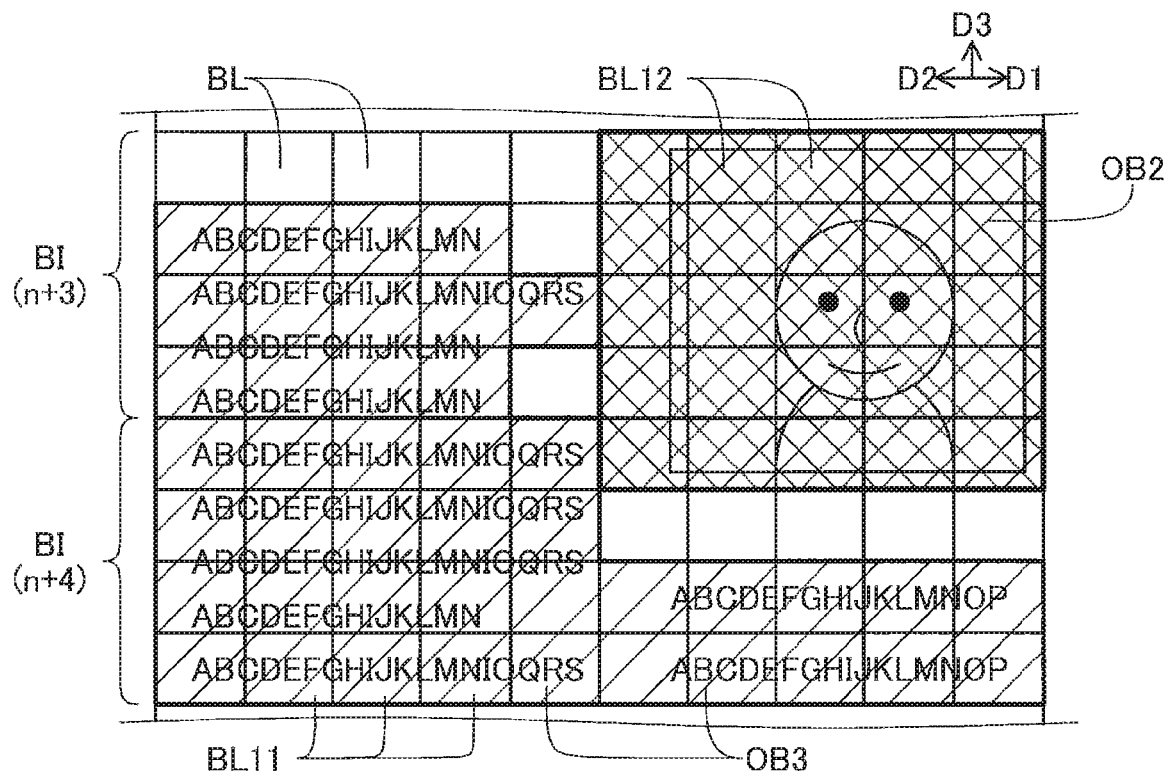
FIG. 19A is an explanatory diagram illustrating text blocks and non-text blocks included in a plurality of band images, where the text blocks are depicted with light shading, and the non-text blocks are depicted with dark shading.

In the first combination C11, the first block type is a "text block," and the second block type is a "non-text block." A text block includes only text objects, and a non-text block includes objects of a type other than text. FIG. 19A is an explanatory diagram illustrating text blocks and non-text blocks. The drawing in FIG. 19A includes the band images BI(n+3) and BI(n+4). A plurality of blocks BL11 depicted with light shading is an example of text blocks (i.e., the first block type). The blocks BL1 represent only the third object OB3 (i.e., text). A plurality of blocks BL12 depicted with dark shading is an example of non-text blocks (i.e., the second block type). The blocks BL12 represent the second object OB2, which is a photograph. The blocks BL12 may include more pixels with dark colors than the blocks BL11. Hence, color variation in the blocks BL12 is more noticeable than color variation in the blocks BL11.

Figure 20A:
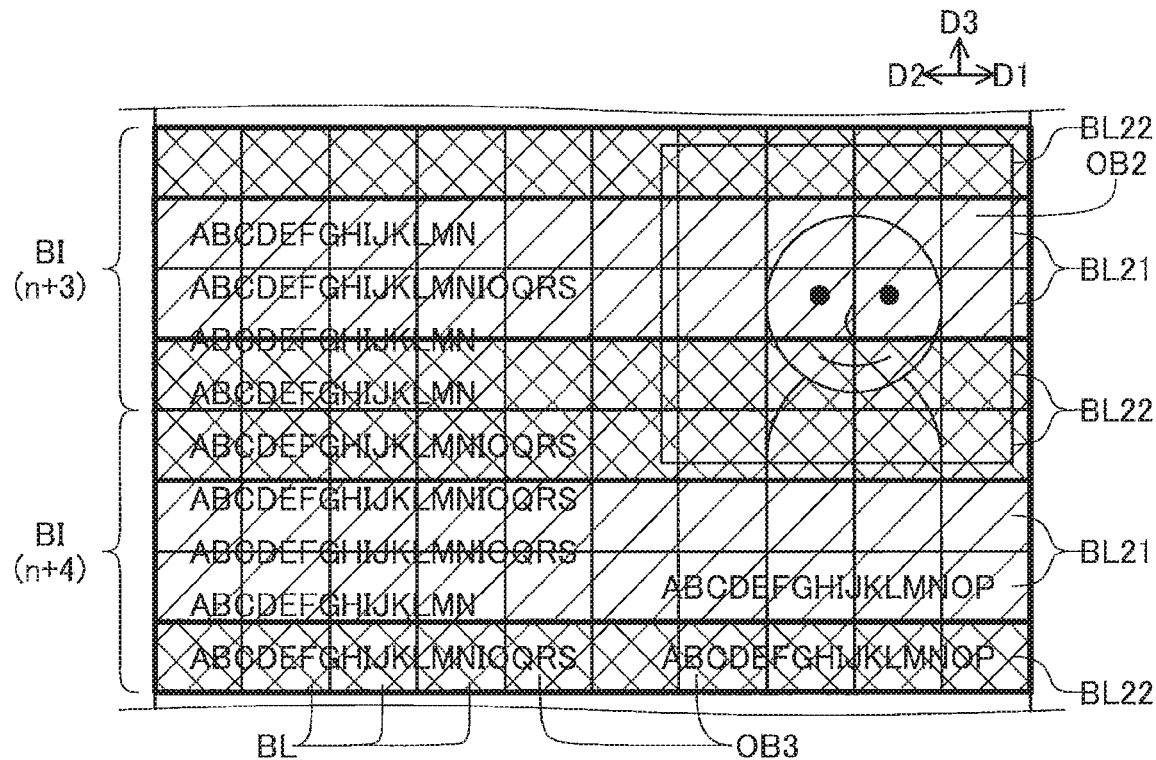
FIG. 20A is an explanatory diagram illustrating interior blocks and edge blocks included in the plurality of band images illustrated in FIG. 19A, where the interior blocks are depicted with light shading, and the edge blocks are depicted with dark shading.

In the second combination C12 (see FIG. 18B), the first block type is an "interior block," and the second block type is an "edge block." FIG. 20A is an explanatory diagram illustrating interior blocks and edge blocks. The drawing in FIG. 20A includes the band images BI(n+3) and BI(n+4). A plurality of blocks BL21 depicted with light shading is an example of interior blocks (the first block type). The blocks BL21 of each band image BI are separated from the edges that run along the main scanning directions D1 and D2 on upstream and downstream sides of the band image BI in the sub-scanning direction D3 (i.e., the borders with neighboring band images BI). A plurality of blocks BL22 depicted with dark shading is an example of edge blocks (the second block type). The blocks BL22 include the edges of each band image BI on the upstream and downstream sides in the sub-scanning direction D3. In other words, each edge block BL22 includes pixels in an edge region including the edge on the upstream side or downstream side in the sub-scanning direction D3. The interior blocks BL21 are the blocks remaining in the band image BI after removing the edge blocks BL22. Each interior block BL21 includes pixels in an interior region different from the edge region in the band image BI. Edge blocks BL22 in the band image BI(n+3) are adjacent to edge blocks BL22 in the band image BI(n+4). Therefore, color variation in these neighboring edge blocks BL22 is more noticeable than color variation in the interior blocks BL21 when a different printing direction is used for the band images BI(n+3) and BI(n+4).

As described above, in the two combinations C11 and C12 color variation in the second block type BL12 and BL22 is more noticeable than in the first block type BL11 and BL21. Therefore, in the present embodiment, the second adjustment process performed on the second condition data 300d for the second block type suppresses unintended selection of the bidirectional method more than the second adjustment process performed on the first condition data 300c for the first block type. In other words, degree of increase in the selectability of the bidirectional method is lower when the second adjustment process adjusts the second condition data 300d for the second block type than when the second adjustment process adjusts the first condition data 300c for the first block type.

FIG. 18C is a portion of a flowchart for the direction-determining method selection process, illustrating steps S333 and S336 that are added to the flowchart in FIG. 6. When the processor 210 reaches a negative determination in S330 of FIG. 6 (S330: NO), in S333 the processor 210 identifies the type of the target block. This process will be also called the "target block type identification process."

Figure 19B:
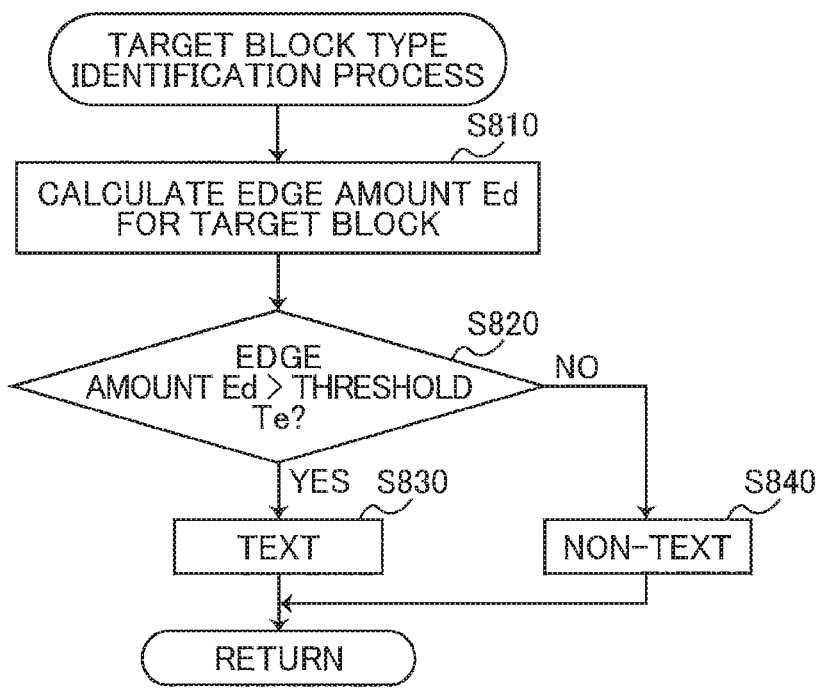
FIG. 19B is a flowchart illustrating steps in a target block type identification process performed by the processor of the multifunction peripheral according to the fifth embodiment of the present disclosure, in which a sample process for identifying text blocks and non-text blocks is illustrated.

FIG. 19B is a flowchart illustrating steps in the target block type identification process. Specifically, FIG. 19B shows a flowchart illustrating a sample process for identifying text blocks and non-text blocks. In S810 of this process, the processor 210 calculates an edge amount Ed for the target block. In the present embodiment, the edge amount Ed for a block is the average value of edge amounts for the plurality of pixels in the block. The edge amount for a single pixel is found by calculating a luminance value from the pixel values (RGB values) and applying a Sobel filter known in the art to the luminance value. Note that any type of edge detection filter, such as a Prewitt filter or a Roberts filter, may be used in place of the Sobel filter. Further, the edge detection filter may be applied to another color component (the gradation value for green, for example) in place of the luminance value.

In S820 the processor 210 determines whether the average edge amount Ed is greater than a prescribed threshold Te. Owing to the fine lines depicting characters, the average edge amount Ed is larger when the target block is a text block than when the target block is a non-text block. Accordingly, if the average edge amount Ed is greater than the threshold Te (S820: YES), in S830 the processor 210 identifies that the target block is a text block. When the average edge amount Ed is less than or equal to the threshold Te (S820: NO), in S840 the processor 210 identifies that the target block is a non-text block. These steps complete the process of FIG. 19B and, hence, the process in step S333 of FIG. 18B.

Any method may be employed for identifying the type of target block to be either a text block or a non-text block. For example, the processor 210 may use a character recognition process well known in the art to recognize characters in the target image. The processor 210 may identify regions different from text and background regions as regions of non-text objects, i.e., objects of a type different from text. Subsequently, the processor 210 may identify the type of the target block according to the type of objects included in the target block.

Figure 20B:
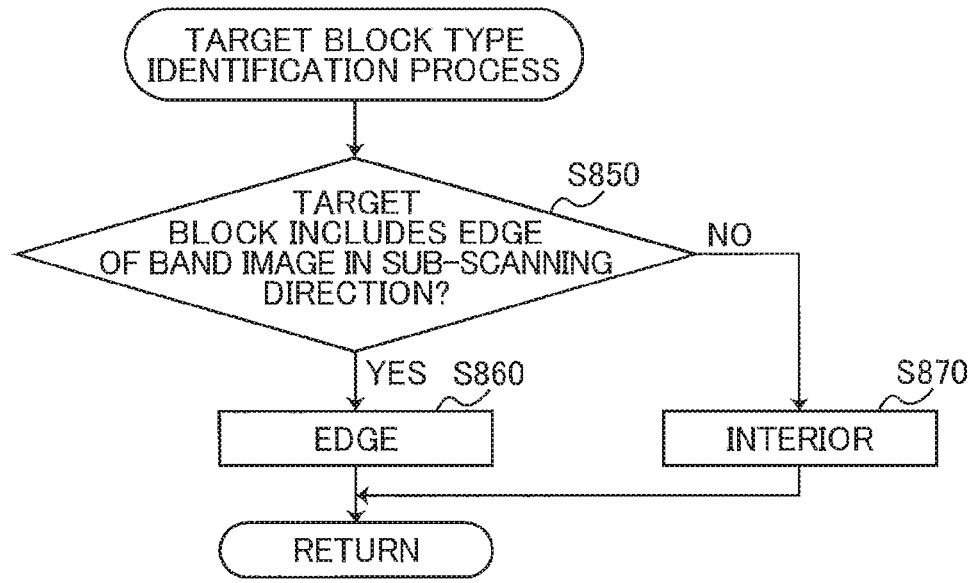
FIG. 20B is another flowchart illustrating steps in the target block type identification process performed by the processor of the multifunction peripheral according to the fifth embodiment of the present disclosure, in which another sample process for identifying interior blocks and edge blocks is illustrated.

FIG. 20B is another flowchart illustrating steps in the target block type identification process. Specifically, FIG. 20B shows a flowchart illustrating a sample process for identifying interior blocks and edge blocks. In S850 the processor 210 determines whether the target block includes an edge of the band image on the upstream or downstream side in the sub-scanning direction D3. When the target block includes an edge, i.e., when the target block abuts an edge (S850: YES), in S860 the processor 210 identifies the target block to be an edge block. When the target block does not include an edge, i.e., when the target block is separated from the edge (S850: NO), in S870 the processor 210 identifies the target block as an interior block. These steps complete the process in FIG. 20B and, hence, the process in step S333 of FIG. 18B.

After completing step S333, in S336 the processor 210 selects condition data from between the first condition data 300c and second condition data 300d that is associated with the type of target block. Upon completing step S336, the processor 210 advances to S340 in FIG. 6. In the process from S340, the processor 210 selects a direction-determining method according to the condition data selected in S336. All processes other than S333 and S336 are identical to those described in FIG. 6.

FIG. 18D is a portion of a flowchart illustrating steps in the second adjustment process. This flowchart indicates a step S623 that is added to the flowchart in FIG. 9. After completing step S620 in FIG. 9, in S623 the processor 210 selects condition data from between the first condition data 300c and second condition data 300d that is associated with the type of candidate block. After completing step S623, the processor 210 advances to S630 in FIG. 9. If the processor 210 reaches an affirmative determination in S630 (S630: YES), in S650 the processor 210 adjusts the condition data selected in S623. All steps in the second adjustment process other than S623 are identical to those described in FIG. 9. However, in S650 the second threshold Wt2 associated with the type of target block is used in S650, as will be described below.

FIG. 18E is a graph showing the relationship between the type of block and the second threshold Wt2, where the horizontal axis represents the type of block and the vertical axis represents the second threshold Wt2. As illustrated in the graph, a second threshold Wt2d for the second type of blocks whose color variation is more noticeable is larger than a second threshold Wt2c for the first type of blocks whose color variation is less noticeable. In the second adjustment process of FIG. 9 performed on the first condition data 300c, weights W greater than the second threshold Wt2c are adjusted to smaller weights W than their pre-adjusted values. In the second adjustment process performed on the second condition data 300d, weights W greater than the second threshold Wt2d are adjusted to smaller weights W than their pre-adjusted values. Here, the second threshold Wt2d is greater than the second threshold Wt2c. As described in FIG. 16C and the like, since the degree of increase in selectability of the bidirectional method is lower when the second threshold Wt2 is larger, unintended selection of the bidirectional method is suppressed when the second threshold Wt2 is large, thereby facilitating selection of the unidirectional method. In the second adjustment process, adjustments to the second condition data 300d are suppressed more with a large second threshold Wt2 than adjustments to the first condition data 300c. Accordingly, this process can reduce noticeable color variation in objects of a type other than text when the first block type is a text block and the second block type is a non-text block. Further, this process reduces noticeable color variation between neighboring edge blocks in neighboring partial images when the first block type is an interior block and the second block type is an edge block.

F. Variations of the Embodiments (1) In the direction-determining method selection process of FIG. 6, the block evaluation value BV is used as an image evaluation value in S340. The image evaluation value is an evaluation value for the directional color difference of a partial image. However, the block evaluation value BV may be any of various values representing the magnitude of a color evaluation value W for the plurality of pixels in a target block. For example, the block evaluation value BV may be a maximum, minimum, median, or mode of the color evaluation values W rather than the average color evaluation value W. Alternatively, the block evaluation value BV may be a cumulative value of color evaluation values W for the plurality of pixels in the target block. Further, the pixels used to identify the block evaluation value BV may be some of the plurality of pixels in the target block. For example, the plurality of pixels remaining in a block after uniformly thinning out a plurality of pixels may be employed to identify the block evaluation value BV.

The specific condition for setting the printing direction (and specifically, the condition for selecting the unidirectional method) may be any condition specifying that the image evaluation value (i.e., the evaluation value for directional color difference in a partial image) is greater than or equal to a threshold rather than the condition in FIG. 6 that the block evaluation value BV for at least one block BL be greater than or equal to the block evaluation value threshold BVt. For example, the ratio of blocks BL having a block evaluation value BV greater than or equal to the block evaluation value threshold BVt to all blocks BL in the partial image may be used as the image evaluation value. In this case, the specific condition is that the ratio of such blocks BL be greater than or equal to a ratio threshold.

(2) The image evaluation value may be any of various values specifying the magnitude of directional color difference in a partial image instead of a value expressed using the block evaluation value BV. The image evaluation value may be calculated independently of blocks using the weights W for a plurality of pixels in the partial image (such as the average, maximum, minimum, median, mode, or cumulative value). Here, all or some of the pixels in the partial image may be used. The specific condition may indicate that this image evaluation value be greater than or equal to a threshold value.

In any of the above variations, the condition data (the condition data 300 in FIG. 1, for example) may include various data for setting the specific condition (data specifying the ratio threshold, for example).

(3) In the second embodiment of FIGS. 12 and 13, condition data may be adjusted using one or more sets of the condition settings from the plurality of sets. For example, if all overdetection determination errors and misdetection determination errors are resolved, the condition data may be set using the adjusted weight table 310 and the target condition settings up to that point and not any unprocessed condition settings. Further, resolution of misdetection determination errors may be prioritized while overdetection determination errors are allowed. This method can suppress color variation while avoiding a major loss in printing speed.

(4) In the first adjustment process of FIG. 7, pixels used to identify weights W to be adjusted may be various other pixels instead of the pixels included in the block having the largest block evaluation value. For example, a labeling process may be performed to sort the plurality of pixels in the partial image into P number of pixel groups (where P is an integer greater than or equal to one), and weights W related to the pixel group having the largest average weight W may be adjusted.

(5) In the second adjustment process of FIG. 9, pixels used for identifying weights W to be adjusted may be various other pixels in place of the pixels included in the first block found. For example, a labeling process may be performed to sort the plurality of pixels in the partial image into Q number of pixel groups (where Q is an integer greater than or equal to one), and weights W related to the pixel group having the largest average weight W may be adjusted.

(6) In the process of FIG. 4 and the like, only one of the first adjustment process (S210) and the second adjustment process(S220) need be executed. For example, the first adjustment process may be omitted when initial values of weights W in the weight table 310 (see FIG. 3A) are set to values sufficiently large not to produce a misdetection determination error. Similarly, the second adjustment process may be omitted when the initial values of weights W are set to values sufficiently small not to produce an overdetection determination error.

(7) The direction-determining method used when the specific condition is met may be a continuation method in place of the unidirectional method for setting the printing direction to the same direction used in the preceding partial print. When using the continuation method, noticeable color variation between neighboring partial images can be suppressed. In this way, the method of determining the printing direction may be set to one method between either the unidirectional method or continuation method (hereinafter called the first determination method), and the bidirectional method (hereinafter called the second determination method).

(8) The correlations between the unadjusted weight Wi and adjusted weight Wo may have various relationships in the adjustment process of FIGS. 8A through 8D, 10A through 10D, and the like. For example, the adjusted weight Wo may change so as to describe a curve or may change in steps in response to changes in the unadjusted weight Wi. Alternatively, the adjusted weight Wo may be a value obtained by multiplying the unadjusted weight Wi by a prescribed coefficient. In either case, in the first adjustment process of FIGS. 8A through 8D and the like, the processor 210 may adjust weights W within a plurality of correlations specified in a weight table (the RGB-W correlations in FIG. 3A, for example) that exceed a first adjustment threshold (the first threshold Wt1, for example) to larger weights W than their pre-adjusted values. Further, in the second adjustment process of FIGS. 10A through 10D and the like, the processor 210 may adjust weights W among the plurality of correlations specified in a weight table that exceed a second adjustment threshold (the second threshold Wt2, for example) to smaller weights W than their pre-adjusted values.

(9) In the third embodiment described in FIGS. 16C through 16E, the second threshold Wt2 may change so as to describe a curve or may change in steps in response to changes in the corresponding parameters T, H, and Tm. Various parameters may be used for adjusting the condition data. For example, two or more parameters selected from among the temperature T, humidity H, and elapsed time Tm may be employed. In all cases, the condition data is adjusted so that the specific condition is less likely to be met in order that the bidirectional method is more likely to be selected. For example, the weights W may be adjusted to smaller values, as in the second adjustment process in FIGS. 9 and 10A through 10D. Here, the specific condition is less likely to be met when the second threshold Wt2 is smaller, since weights W in many grid points GD will be decreased. Further, the block size (the block width BW or block height BH) may be adjusted to a larger value, as described in FIG. 14A. Alternatively, the threshold value for determining the magnitude of the image evaluation value (the block evaluation value threshold BVt or the ratio threshold described above, for example) may be adjusted to a larger value. Further, when condition data is selected from a plurality of predetermined candidates for condition data (a plurality of weight tables 310, for example), the condition data may be modified to a different candidate with which the specific condition is less likely to be met.

An adjustment opposite to the adjustment performed for facilitating selection of the bidirectional method is performed to facilitate selection of the first determination method (the unidirectional method or continuation method). For example, weights W are adjusted to larger values, as in the first adjustment process of FIGS. 7 and 8A through 8D. Here, the specific condition becomes more easily satisfied since weights W in many grid points GD are increased when the first threshold Wt1 is smaller. Alternatively, the block size may be adjusted to a smaller value; the threshold value for determining the magnitude of the image evaluation value may be adjusted to a smaller value; and the condition data may be modified to a different candidate among the plurality of candidates with which the specific condition is more easily met.

(10) The multifunction peripheral 200 may have various available printing modes. For example, the available printing modes may include any two or more combinations selected from the four combinations C1 through C4 in FIG. 17B. Further, the block types are not limited to the types in FIG. 18B, but may be selected from various types. Condition data may be prepared for each combination of printing mode and block type. In general, condition data corresponding to a plurality of process conditions may be used for the plurality of printing modes and the plurality of block types. Condition data for a plurality of conditions may be independently adjusted according to the various adjustment methods described above (the adjustment method using temperature T or another parameter, for example).

(11) The adjustment process for condition data may be any of various processes other than the processes described above. For example, the adjustment process in the fourth embodiment of FIG. 17C may be applied to the process in FIGS. 12 and 13 according to the second embodiment. The format of image data used in the adjustment process and the printing process may be various formats other than the bitmap format in the RGB color space. For example, image data in the bitmap format of the YCbCr color space may be used for printing.

(12) The printing device may have any of various configurations in addition to the configuration illustrated in FIGS. 1 and 2A through 2C. For example, the number of ink colors available for printing (and hence, the number of nozzle groups) may be any number of two or greater. In addition, a stand-alone printing device not provided with the scanning unit 280 may be employed. Further, the adjustment process for condition data may be executed by an external device connected to the printing device, such as the data-processing device 100 connected to the multifunction peripheral 200. The adjustment process for condition data may also be performed by the manufacturer of the printing device, or the user of the printing device. An external device connected to the printing device may also execute the printing process (the process in FIG. 11, for example). Adjusted condition data may be provided as part of a printer driver.

In the embodiments described above, part of the configuration implemented in hardware may be replaced with software and, conversely, all or part of the configuration implemented in software may be replaced with hardware. For example, the direction-determining method selection process in FIG. 6 may be executed with a dedicated hardware circuit.

When all or some of the functions in the present disclosure are implemented with computer programs, the programs may be stored on a computer-readable storage medium (a non-transitory computer-readable storage medium, for example). The programs may be used on the same storage medium on which they were supplied or may be transferred to a different storage medium (a computer-readable storage medium). The "computer-readable storage medium" may be a portable storage medium, such as a memory card or a CD-ROM; an internal storage device built into the computer, such as any of various ROM or the like; or an external storage device, such as a hard disk drive, connected to the computer.

While the description has been made in detail with reference to specific embodiments, it would be apparent to those skilled in the art that various changes and modifications may be made thereto.

What is claimed is:

1. An information processing apparatus configured to adjust condition data for controlling a printing device, the printing device including: a print head having a plurality of nozzle groups including a first nozzle group and a second nozzle group arranged in a main scanning direction, the first nozzle group including a plurality of first nozzles arranged in a sub-scanning direction crossing the main scanning direction, each of the plurality of first nozzles being configured to eject a droplet of ink in a first color onto a printing medium, the second nozzle group including a plurality of second nozzles arranged in the sub-scanning direction, each of the plurality of second nozzles being configured to eject a droplet of ink in a second color onto the printing medium; a reciprocating device configured to perform a main scan moving the print head relative to the printing medium in a printing direction, the printing direction being set to one of a first direction and a second direction, the first direction being parallel to the main scanning direction, the second direction being parallel to the main scanning direction and opposite to the first direction; and a conveying device configured to perform a sub scan intermittently moving the printing medium relative to the print head in the sub-scanning direction, the printing device being configured to repeatedly and alternately execute a partial print and the sub scan to print an image represented by image data on the printing medium, the information processing apparatus comprising a controller configured to perform:

(a) acquiring target image data representing a target image, the target image being made up of a plurality of partial images arranged in the sub-scanning direction, the partial print printing a single partial image on the printing medium while performing the main scan;

(b) determining whether a specific condition is met for each of the plurality of partial images, the specific condition indicating that an image evaluation value be greater than or equal to a threshold, the image evaluation value being calculated for each of the plurality of partial images using the condition data, the image evaluation value for a target partial image representing an expected color difference between a first target partial image printed by a first-directional partial print and a second target partial image printed by a second-directional partial print, the first-directional partial print being the partial print in which the printing direction is set to the first direction, the second-directional partial print being the partial print in which the printing direction is set to the second direction;

(c) selecting a direction-determining method for each of the plurality of partial images from a first determination method and a second determination method in accordance with a determination result of whether the specific condition is met in the (b) determining, the first determination method setting the printing direction for the target partial image to a predetermined direction, the second determination method setting the printing direction for the target partial image to a direction opposite to the printing direction set for a preceding partial image, the target partial image being printed subsequent to the preceding partial image;

(d) determining whether the selected direction-determining method selected for each of the plurality of partial images in the (c) selecting matches a correct method, the correct method being predetermined for each of the plurality of partial images; and
(e) adjusting, in response to determining that the selected direction-determining method differs from the correct method, the condition data, the (e) adjusting performing at least one of:
(e1) adjusting the condition data so as to increase selectability of the first determination method in a case where the selected direction-determining method is the second determination method while the correct method is the first determination method; and
(e2) adjusting the condition data so as to increase selectability of the second determination method in a case where the selected direction-determining method is the first determination method while the correct method is the second determination method.

2. The information processing apparatus according to claim 1, wherein the first determination method sets the printing direction for the target partial image to the same direction as the printing direction for the preceding partial image.

3. The information processing apparatus according to claim 1, wherein the first determination method sets the printing direction for the target partial image to the first direction irrespective of the printing direction for the preceding partial image.

4. The information processing apparatus according to claim 1, wherein the (e2) adjusting comprises:
(e21) acquiring a temperature in the printing device; and
(e22) adjusting the condition data according to the temperature so as to increase the selectability of the second determination method, degree of increase in the selectability of the second determination method being lower when the temperature is higher than a temperature threshold than when the temperature is lower than or equal to the temperature threshold.

5. The information processing apparatus according to claim 1, wherein the (e2) adjusting comprises:
(e23) acquiring humidity in the printing device; and
(e24) adjusting the condition data according to the humidity so as to increase the selectability of the second determination method, degree of increase in the selectability of the second determination method being lower when the humidity is lower than a humidity threshold than when the humidity is higher than or equal to the temperature threshold.

6. The information processing apparatus according to claim 1, wherein the printing device further includes a mounting portion in which a first cartridge accommodating therein the ink in the first color and a second cartridge accommodating therein the ink in the second color are mountable,
wherein the (e2) adjusting comprises:
(e25) acquiring an elapsed time after one of the first cartridge and the second cartridge was last replaced in the mounting portion of the printing device; and
(e26) adjusting the condition data according to the elapsed time so as to increase the selectability of the second determination method, degree of increase in the selectability of the second determination method being lower when the elapsed time is longer than a time threshold than when the elapsed time is less than or equal to the time threshold.

7. The information processing apparatus according to claim 1, wherein the controller is configured to control the printing device according to a control mode selected from among a plurality of control modes including a first mode and a second mode having less ink usage than the first mode,
wherein the condition data includes first condition data used for the first mode and second condition data used for the second mode, and
wherein the (e2) adjusting adjusts the first condition data when the control mode is the first mode, and adjusts the second condition data when the control mode is the second mode, degree of increase in the selectability of the second determination method being lower when the (e2) adjusting adjusts the first condition data than when the (e2) adjusting adjusts the second condition data.

8. The information processing apparatus according to claim 1, wherein the controller is configured to control the printing device according to a control mode selected from among a plurality of control modes including a first mode and a second mode, the first mode having a higher contrast in printed images than the second mode,
wherein the condition data includes first condition data used for the first mode and second condition data used for the second mode, and
wherein the (e2) adjusting adjusts the first condition data when the control mode is the first mode, and adjusts the second condition data when the control mode is the second mode, degree of increase in the selectability of the second determination method being lower when the (e2) adjusting adjusts the first condition data than when the (e2) adjusting adjusts the second condition data.

9. The information processing apparatus according to claim 1, wherein the controller is configured to control the printing device according to a control mode selected from among a plurality of control modes including a first mode and a second mode, the printing device printing images on a single side of the printing medium in the first mode and printing images on both sides of the printing medium in the second mode,
wherein the condition data includes first condition data used for the first mode and second condition data used for the second mode, and
wherein the (e2) adjusting adjusts the first condition data when the control mode is the first mode, and adjusts the second condition data when the control mode is the second mode, degree of increase in the selectability of the second determination method being lower when the (e2) adjusting adjusts the first condition data than when the (e2) adjusting adjusts the second condition data.

10. The information processing apparatus according to claim 1, wherein the controller is configured to control the printing device according to a control mode selected from among a plurality of control modes including a first mode and a second mode, the printing device printing images on a first type of printing medium in the first mode and printing images on a second type of printing medium on which ink dries slower than the first type of printing medium in the second mode,
wherein the condition data includes first condition data used for the first mode and second condition data used for the second mode, and
wherein the (e2) adjusting adjusts the first condition data when the control mode is the first mode, and adjusts the second condition data when the control mode is the second mode, degree of increase in the selectability of the second determination method being lower when the (e2) adjusting adjusts the first condition data than when the (e2) adjusting adjusts the second condition data.

11. The information processing apparatus according to claim 1, wherein each of the plurality of partial images is made up with a plurality of blocks including a first block type and a second block type, the first block type having at least one pixel, the second block type having at least one pixel, wherein the condition data includes first condition data used for the at least one pixel in the first block type and second condition data used for the at least one pixel in the second block type, and wherein the (e2) adjusting adjusts the first condition data and the second condition data so as to increase the selectability of the second determination method, degree of increase in the selectability of the second determination method being lower when the (e2) adjusting adjusts the second condition data than when the (e2) adjusting adjusts the first condition data.

12. The information processing apparatus according to claim 11, wherein the first block type only includes a text object, and the second block type includes an object different from the text object.

13. The information processing apparatus according to claim 11, wherein the second block type includes a pixel in an edge region including an edge on an upstream side or a downstream side of the target image in the sub-scanning direction, and the first block type includes a pixel in an interior region different from the edge region in the target image.

14. The information processing apparatus according to claim 1, wherein the condition data includes correlation data specifying correlations between a plurality of color values in a color space corresponding to the target image data and respective ones of color evaluation values, a single color value being correlated with a single color evaluation value representing an expected color difference between a first image printed according to the single color value by the first-directional partial print and a second image printed according to the single color value by the second-directional partial print, wherein the controller is configured to further perform (f) calculating the image evaluation value for each of the plurality of partial images using the correlation data, the target partial image including a plurality of pixels, each of the plurality of pixels having a color value, the image evaluation value for the target partial image being calculated by using a color evaluation value correlated with the color value of each of the plurality of pixels, and wherein the (b) determining is performed using the image evaluation value calculated in the (f) calculating.

15. The information processing apparatus according to claim 14, wherein each of the plurality of partial images is made up with a plurality of blocks, each of the plurality of blocks including a plurality of block pixels having respective ones of a plurality of block color values, and wherein the (e1) adjusting comprises:
(e11) calculating a plurality of block evaluation values for respective ones of the plurality of blocks in each of the plurality of partial images, a block evaluation value for a single block being calculated using a plurality of color evaluation values corresponding to respective ones of the plurality of block color values for the single block in the correlation data, the block evaluation value for the single block representing an expected color difference between a first image of the single block printed by the first-directional partial print and a second image of the single block printed by the second-directional partial print;
(e12) identifying a target block having a largest block evaluation value among the plurality of blocks for each of the plurality of partial images; and
(e13) increasing the plurality of color evaluation values corresponding to respective ones of the plurality of block color values for the target block in the correlation data.

16. The information processing apparatus according to claim 14, wherein each of the plurality of partial images is made up with a plurality of blocks, each of the plurality of blocks including a plurality of block pixels having respective ones of a plurality of block color values, and wherein the (e2) adjusting comprises:
(e27) calculating a plurality of block evaluation values for respective ones of the plurality of blocks in each of the plurality of partial images, a block evaluation value for a single block being calculated using a plurality of color evaluation values corresponding to respective ones of the plurality of block color values for the single block in the correlation data, the block evaluation value for the single block representing an expected color difference between a first image of the single block printed by the first-directional partial print and a second image of the single block printed by the second-directional partial print;
(e28) identifying a target block having the block evaluation value greater than or equal to a block threshold among the plurality of blocks for each of the plurality of partial images; and
(e29) decreasing the plurality of color evaluation values corresponding to respective ones of the plurality of block color values for the target block in the correlation data.

17. An adjusting method for adjusting condition data for controlling a printing device, the printing device including: a print head having a plurality of nozzle groups including a first nozzle group and a second nozzle group arranged in a main scanning direction, the first nozzle group including a plurality of first nozzles arranged in a sub-scanning direction crossing the main scanning direction, each of the plurality of first nozzles being configured to eject a droplet of ink in a first color onto a printing medium, the second nozzle group including a plurality of second nozzles arranged in the sub-scanning direction, each of the plurality of second nozzles being configured to eject a droplet of ink in a second color onto the printing medium; a reciprocating device configured to perform a main scan moving the print head relative to the printing medium in a printing direction, the printing direction being set to one of a first direction and a second direction, the first direction being parallel to the main scanning direction, the second direction being parallel to the main scanning direction and opposite to the first direction; and a conveying device configured to perform a sub scan intermittently moving the printing medium relative to the print head in the sub-scanning direction, the printing device being configured to repeatedly and alternately execute a partial print and the sub scan to print an image represented by image data on the printing medium, the adjusting method comprising:

(a) acquiring target image data representing a target image, the target image being made up of a plurality of partial images arranged in the sub-scanning direction, the partial print printing a single partial image on the printing medium while performing the main scan;

(b) determining whether a specific condition is met for each of the plurality of partial images, the specific condition indicating that an image evaluation value be greater than or equal to a threshold, the image evaluation value being calculated for each of the plurality of partial images using the condition data, the image evaluation value for a target partial image representing an expected color difference between a first target partial image printed by a first-directional partial print and a second target partial image printed by a second-directional partial print, the first-directional partial print being the partial print in which the printing direction is set to the first direction, the second-directional partial print being the partial print in which the printing direction is set to the second direction;

(c) selecting a direction-determining method for each of the plurality of partial images from a first determination method and a second determination method in accordance with a determination result in the (b) determining, the first determination method setting the printing direction for the target partial image to a predetermined direction, the second determination method setting the printing direction for the target partial image to a direction opposite to the printing direction set for a preceding partial image, the target partial image being printed subsequent to the preceding partial image;

(d) determining whether the selected direction-determining method selected for each of the plurality of partial images in the (c) selecting matches a correct method, the correct method being predetermined for each of the plurality of partial images; and (e) adjusting, in response to determining that the selected direction-determining method differs from the correct method, the condition data, the (e) adjusting performing at least one of:

(e1) adjusting the condition data so as to increase selectability of the first determination method in a case where the correct method is the first determination method while the selected direction-determining method is the second determination method; and (e2) adjusting the condition data so as to increase selectability of the second determination method in a case where the correct method is the second determination method while the selected direction-determining method is the first determination method.

18. A non-transitory computer readable storage medium storing a set of program instructions installed on and executed by a computer configured to adjust condition data for controlling a printing device, the printing device including: a print head having a plurality of nozzle groups including a first nozzle group and a second nozzle group arranged in a main scanning direction, the first nozzle group including a plurality of first nozzles arranged in a sub-scanning direction crossing the main scanning direction, each of the plurality of first nozzles being configured to eject a droplet of ink in a first color onto a printing medium, the second nozzle group including a plurality of second nozzles arranged in the sub-scanning direction, each of the plurality of second nozzles being configured to eject a droplet of ink in a second color onto the printing medium; a reciprocating device configured to perform a main scan moving the print head relative to the printing medium in a printing direction, the printing direction being set to one of a first direction and a second direction, the first direction being parallel to the main scanning direction, the second direction being parallel to the main scanning direction and opposite to the first direction; and a conveying device configured to perform a sub scan intermittently moving the printing medium relative to the print head in the sub-scanning direction, the printing device being configured to repeatedly and alternately execute a partial print and the sub scan to print an image represented by image data on the printing medium, the set of program instructions comprising:

(a) acquiring target image data representing a target image, the target image being made up of a plurality of partial images arranged in the sub-scanning direction, the partial print printing a single partial image on the printing medium while performing the main scan;

(b) determining whether a specific condition is met for each of the plurality of partial images, the specific condition indicating that an image evaluation value be greater than or equal to a threshold, the image evaluation value being calculated for each of the plurality of partial images using the condition data, the image evaluation value for a target partial image representing an expected color difference between a first target partial image printed by a first-directional partial print and a second target partial image printed by a second-directional partial print, the first-directional partial print being the partial print in which the printing direction is set to the first direction, the second-directional partial print being the partial print in which the printing direction is set to the second direction;

(c) selecting a direction-determining method for each of the plurality of partial images from a first determination method and a second determination method in accordance with a determination result in the (b) determining, the first determination method setting the printing direction for the target partial image to a predetermined direction, the second determination method setting the printing direction for the target partial image to a direction opposite to the printing direction set for a preceding partial image, the target partial image being printed subsequent to the preceding partial image;

(d) determining whether the selected direction-determining method selected for each of the plurality of partial images in the (c) selecting matches a correct method, the correct method being predetermined for each of the plurality of partial images; and (e) adjusting, in response to determining that the selected direction-determining method differs from the correct method, the condition data, the (e) adjusting performing at least one of:

(e1) adjusting the condition data so as to increase selectability of the first determination method in a case where the correct method is the first determination method while the selected direction-determining method is the second determination method; and (e2) adjusting the condition data so as to increase selectability of the second determination method in a case where the correct method is the second determination method while the selected direction-determining method is the first determination method.

* * * * *